(12) United States Patent
Yamagata et al.

(10) Patent No.: US 8,081,558 B2
(45) Date of Patent: Dec. 20, 2011

(54) OPTICAL SYSTEM OF OPTICAL PICK-UP AND OPTICAL INFORMATION RECORDING/REPRODUCING APPARATUS

(75) Inventors: Naoki Yamagata, Tokyo (JP); Satoshi Inoue, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/914,218

(22) Filed: Oct. 28, 2010

(65) Prior Publication Data

US 2011/0103207 A1    May 5, 2011

(30) Foreign Application Priority Data

Oct. 29, 2009 (JP) ................................ 2009-248710
Jul. 16, 2010 (JP) ................................ 2010-161118

(51) Int. Cl.
*G11B 7/00* (2006.01)
(52) U.S. Cl. ........... 369/112.25; 369/112.26; 369/44.32; 359/719
(58) Field of Classification Search ............. 369/112.01, 369/112.23, 112.24, 112.25, 112.26, 44.32; 359/719
See application file for complete search history.

(56) References Cited

U.S. PATENT DOCUMENTS

| | | | |
|---|---|---|---|
| 7,801,010 B2 * | 9/2010 | Maezawa et al. | 369/112.23 |
| 2004/0036972 A1 | 2/2004 | Kimura et al. | |
| 2005/0254399 A1 | 11/2005 | Kimura | |
| 2006/0002279 A1 * | 1/2006 | Okamura | 369/112.23 |
| 2008/0137517 A1 * | 6/2008 | Maezawa et al. | 369/112.23 |
| 2010/0128592 A1 | 5/2010 | Kimura | |

FOREIGN PATENT DOCUMENTS

| | | |
|---|---|---|
| JP | 2008-176916 | 7/2008 |
| JP | 4193914 | 12/2008 |
| JP | 2009-117030 | 5/2009 |

* cited by examiner

*Primary Examiner* — Latanya Bibbins
(74) *Attorney, Agent, or Firm* — Greenblum & Bernstein P.L.C.

(57) ABSTRACT

An optical system of an optical pick-up including a resin coupling lens and a resin objective lens with NA larger than 0.8, wherein, magnification β satisfies a condition: $-0.13 < \beta < -0.08$, a focal length f of the objective lens satisfies a condition: $1.15 < f < 1.50$, the objective lens has an annular zone structure on at least one surface of the objective lens, and the annular zone structure has a plurality of annular zones and has steps each of which extends in a direction of an optical axis of the objective lens and is formed at a boundary between adjacent ones of the plurality of annular zones to cause a predetermined optical path length difference between a light beam passing inside the boundary and a light beam passing outside the boundary, and the optical system of an optical pick-up satisfies a condition:

Figure 1:
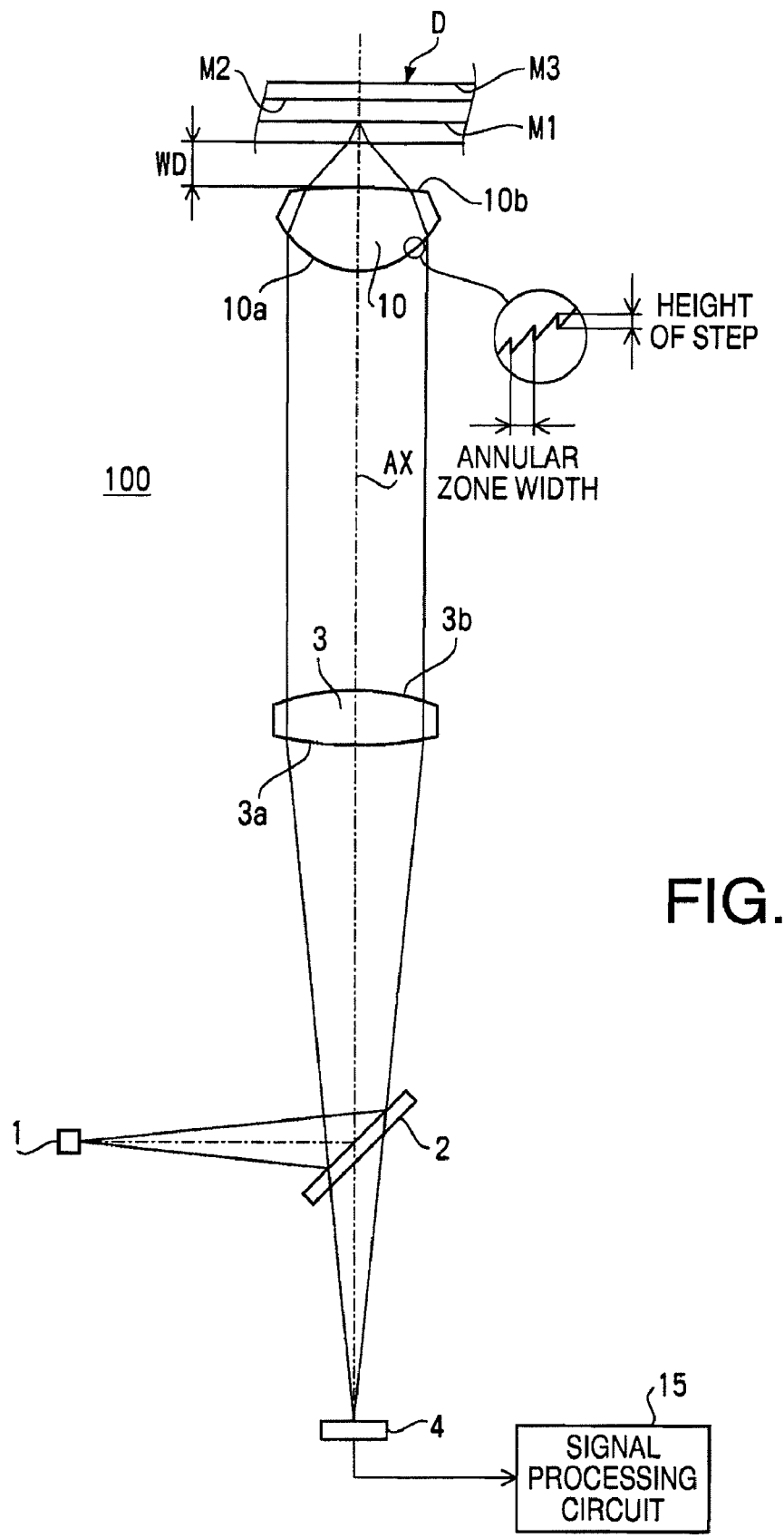

$$0.065 < \frac{\left(\frac{\sum \Phi_{0.95-1.00}}{\sum \Phi_{0.00-1.00}}\right) \times \frac{d_0 \times n}{f^2 \times \left(\frac{NA}{0.85}\right)^4}}{P_{ave} + \frac{1}{L}} < 0.100$$

where
$L = L_0 + (1 - \cos\theta)$
$L_0 = \frac{m\lambda}{n-1}.$

12 Claims, 12 Drawing Sheets

OPTICAL SYSTEM OF OPTICAL PICK-UP AND OPTICAL INFORMATION RECORDING/REPRODUCING APPARATUS

BACKGROUND OF THE INVENTION

The present invention relates to an optical system of an optical pick-up and an optical information recording/reproducing apparatus for recording information to and/or reproducing information from an optical disc complying with a predetermined standard. More specifically, the present invention relates to optical system of an optical pick-up having an objective lens made of resin (hereafter, frequently referred to as a resin lens) having a numerical aperture larger than 0.8 which is suitable for information recording/reproducing for a high-recording density optical disc, such as BD (Blu-ray Disc), and an optical information recording/reproducing apparatus on which the optical system of an optical pick-up is installed.

There exist various standards of optical discs, such as CD (Compact Disc) and DVD (Digital Versatile Disc), differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording.

Since the high-recording density optical disc has the higher recording density than DVD and CD, a beam spot having a relatively small diameter is required for information recording and reproducing for the high-recording density optical disc. That is, a large NA is required for information recording/reproducing (i.e., information recording and/or information reproducing) for the high-recording density optical disc. For this reason, in general a glass lens having a relatively high refractive index is used as an objective lens for the optical information recording/reproducing apparatus. However, a glass lens has a drawback that since a glass lens is heavy in weight, the glass lens places a burden on operation of an actuator for driving the lens when the actuator moves the lens in a focusing direction or in a tracking direction.

Therefore, a designer might consider forming a lens with resin in place of glass as material in order to reduce weight of the lens. By achieving the weight reduction through use of resin as material of the lens, it becomes possible to reduce the burden to be placed on the actuator for driving the objective lens. Furthermore, forming the objective lens for the high-recording density optical disc with resin provides advantages in regard to easiness of production, a high degree of productivity and cost. However, when resin is used as material of the lens, a drawback arises as described below. Each of Japanese Patent Provisional Publications No. 2008-176916A (hereafter, referred to as JP2008-176916A) and No. 2009-117030A (hereafter, referred to as JP2009-117030A) and Japanese Patent Publication No. 4193914 (hereafter, referred to as JP4193914) discloses an optical information recording/reproducing apparatus employing a resin objective lens. The optical information recording/reproducing apparatus disclosed in each of these publications has a configuration to prevent deterioration of optical performance caused by the drawback regarding the resin lens as described below.

In regard to a rate of change of refractive index caused when temperature changes, resin has the rate of change of refractive index which is more than ten times larger than the rate of change of refractive index of glass. Therefore, the resin lens has a drawback that the changing amount of spherical aberration due to change of refractive index (i.e., temperature changes) is considerably larger than that of a glass lens. For this reason, the optical information recording/reproducing apparatus disclosed in JP2008-176916A is configured such that a coupling lens is arranged to be movable to cancel the spherical aberration caused by the temperature changes by controlling the degree of divergence of a light beam incident on the objective lens. However, a temperature compensation mechanism of this type has a drawback that a dedicated component, such as a temperature sensor, is required and therefore the configuration of the apparatus becomes complicated.

The spherical aberration is also caused by the difference in protective layer thickness or in intermediate layer thickness of an optical disc. In general, the spherical aberration of this type is also corrected by using a coupling lens arranged to be movable. However, in order to correct both of the spherical aberration due to the temperature changes and the spherical aberration due to the difference in protective layer thickness or in intermediate layer thickness simultaneously, the coupling lens needs to have a wide movable range. In this case, it is required to increase the size of the optical information recording/reproducing apparatus. Furthermore, a drawback arises that a load placed on an actuator for moving the coupling lens becomes large. For this reason, in order to omit the temperature compensation mechanism, the optical information recording/reproducing apparatus disclosed in JP2009-117030A is configured such that the change of spherical aberration due to the temperature changes is suppressed by setting a focal length of an objective lens to be small. However, in this case, it becomes difficult to secure an adequate working distance, i.e., a distance between the protective layer surface of the optical disc and the surface of the objective lens facing the protective layer surface.

In order to omit the temperature compensation mechanism, the optical information recording/reproducing apparatus disclosed in JP4193914 is configured to give a lens surface shape for suppressing the temperature change rate of the $3^{rd}$-order spherical aberration to the objective lens. However, a diffraction structure formed on the lens surface is configured to produce high-order diffracted light, and therefore each annular zone has a great depth. In this case, a transferring failure may be caused during a molding process of the objective lens. When such a transferring failure occurs, lowering of the light amount is caused in the optical information recording/reproducing apparatus.

SUMMARY OF THE INVENTION

The present invention is advantageous in that it provides an optical system of an optical pick-up for a high recoding density optical disc having a resin objective lens configured suitably to suppress the change of spherical aberration due to the temperature changes, and an optical information recording/reproducing apparatus on which the optical system of an optical pick-up is installed.

According to an aspect of the invention, there is provided an optical system of an optical pick-up, which is provided with a coupling lens that is made of resin and changes a degree of divergence of a light beam emitted by a light source, and an objective lens that is made of resin and has a numerical aperture NA larger than 0.8, the objective lens converging the light beam emerging from the coupling lens onto a recording surface of an optical disc. In this configuration, when β represents a magnification of an optical system formed by the coupling lens and the objective lens with respect to a use wavelength λ (unit: nm), the magnification β satisfies a condition: $-0.13 < \beta < -0.08$ ... (1). When f (unit: mm) represents a focal length of the objective lens with respect to the use wavelength λ, the focal length f satisfies a condition: $1.15 < f < 1.50$ ... (2). The objective lens has an annular zone structure on at least one surface of the objective lens, and the annular zone structure has a plurality of annular zones and has steps each of which extends in a direction of an optical axis of the objective lens and is formed at a boundary between adjacent ones of the plurality of annular zones to cause a predetermined optical path length difference between a light beam passing inside the boundary and a light beam passing outside the boundary. When ($\Sigma\phi_{0.00-1.00}$) represents a sum of absolute values of heights of all the steps of the annular zone structure formed within an effective beam diameter, ($\Sigma\phi_{0.95-1.00}$) represents a sum of absolute values of heights of all the steps of the annular zone structure formed within a range of 95% to 100% of an effective beam radius with respect to the optical axis, n represents a refractive index of the objective lens at the use wavelength λ, and $d_0$ (unit: mm) represents a thickness of the objective lens defined on the optical axis, $P_{ave}$ represents an average of distances between adjacent ones of the steps formed within the range of 95% to 100% of the effective beam radius, θ represents a maximum angle of angles formed, within the range of 95% to 100% of the effective beam radius, between a normal to the at least one surface on which the annular zone structure is formed and a line parallel with the optical axis, L represents an absolute value of a height of a step formed at a position corresponding to the maximum angle, $L_0$ represents an absolute value of a height of a step formed at a position corresponding to the optical axis, and m represents a diffraction order at which a diffraction efficiency is maximized for the light beam having the use wavelength λ incident on the at least one surface on which the annular zone structure is formed, the optical system of an optical pick-up satisfies a condition:

$$0.065 < \frac{\left(\frac{(\sum \Phi_{0.95-1.00})}{(\sum \Phi_{0.00-1.00})} \times \frac{d_0 \times n}{f^2 \times \left(\frac{NA}{0.85}\right)^4}\right)}{P_{ave} + \frac{1}{L}} < 0.100 \quad (3)$$

where $$L = L_0 + (1 - \cos\theta)$$

$$L_0 = \frac{m\lambda}{n-1}.$$

By satisfying the conditions (1) to (3), it becomes possible to suppress variation of the amount of spherical aberration due to temperature changes while securing an adequate working distance. Furthermore, decrease of light amount due to deterioration of the optical performance and a transferring failure becomes hard to occur. Furthermore, since there is no necessity to move the coupling lens to correct the spherical aberration when the temperature change occurs, a moving range of the coupling lens can be set to a small value, which is advantageous in regard to downsizing of the optical system of an optical pick-up.

When β gets smaller than the lower limit of the condition (1), the amount of aberration with respect to an installing error of the coupling lens becomes large. Furthermore, in this case, since the incidence side NA of the coupling lens becomes large, the light amount in the peripheral part in the effective beam diameter of the coupling lens becomes small, and therefore the rim intensity (a ratio of the intensity of light passing through a peripheral part of an objective lens to the intensity of light passing through a central part close to an optical axis of the objective lens) decreases. Due to decrease of the rim intensity, the diameter of the beam spot formed on the recording surface of the optical disc becomes large, which is disadvantageous in regard to information recording and reproducing for the optical disc. When β gets larger than the upper limit of the condition (1), it becomes necessary to place the light source and the coupling lens away from each other, which is disadvantageous in regard to downsizing of an optical system of an optical pick-up and securing of an adequate light amount. In addition, in this case the required driving amount for the coupling lens for correction of the spherical aberration due to, for example, the difference in protective layer thickness of the optical disc increases, which also causes increase of the size of the optical information recording/reproducing apparatus.

When f gets smaller than the lower limit of the condition (2), it becomes difficult to secure an adequate working distance, and it also becomes difficult to secure an adequate moving amount of the coupling lens. When f gets larger than the upper limit of the condition (2), a problem arises that downsizing of the optical system of an optical pick-up becomes difficult, and the amount of spherical aberration due to the temperature changes becomes large.

When the intermediate term of the condition (3) gets smaller than the lower limit of the condition (3), the diffracting effect defined by the relationship between the diffraction order and the number of steps becomes too weak, and therefore it becomes impossible to sufficiently correct the spherical aberration caused by the temperature changes. When the intermediate term of the condition (3) gets larger than the upper limit of the condition (3), the diffracting effect becomes too strong, and therefore correction for the spherical aberration due to the temperature changes becomes excessive. Furthermore, in this case, the amount relating to steps of the annular zone structure in the peripheral part of the objective lens increases. Therefore, the loss of light amount due to a molding error becomes large. As a result, it becomes difficult to secure an adequate amount of light. Furthermore, in this case, the annular zone width becomes too narrow in the peripheral part of the effective beam radius. Therefore, the light beam passing through the peripheral part of the effective beam diameter is blocked and the loss of light amount is caused. Consequently, it becomes difficult to secure an adequate amount of light.

In at least one aspect, when D (unit: mm) represents a moving amount of the coupling lens necessary for correcting a spherical aberration caused by a difference in an optical distance between a surface of a protective layer and the recording surface of the optical disc used for recording or reproducing, and Δt (unit: mm) represents a change amount of the optical distance, the optical system of an optical pick-up may satisfy a condition:

$$-60 < \frac{D}{f \times (1-\beta) \times \Delta t} < -20 \quad (4)$$

where the moving amount D is negative when the coupling lens moves in a direction deviating from the light source and is positive when the coupling lens moves in a direction approaching the light source, and the change amount Δt is negative when the optical distance changes to be short and is positive when the optical distance changes to be long.

By satisfying the condition (4), the spherical aberration caused by the difference in the above described optical distance can be suitably corrected. When the intermediate term of the condition (4) gets smaller than the lower limit of the condition (4), correction for the spherical aberration tends to become insufficient. When the intermediate term of the condition (4) gets larger than the upper limit of the condition (4), correction for the spherical aberration tends to become excessive. In this case, since the moving amount of the coupling lens becomes large, downsizing of the optical information recording/reproducing apparatus becomes difficult to realize.

In at least one aspect, the coupling lens may be moved only for correction of a spherical aberration caused by a difference in the optical distance, a wavelength shift of the light beam from the light source, and a manufacturing error of the objective lens.

With this configuration, the moving range of the coupling lens can be set to be small.

In at least one aspect, when M represents a number of steps of the annular zone structure formed within the effective beam diameter, and h represents an effective beam radius of the resin objective lens, the optical system of an optical pick-up may a following condition (5):

$$2.0 < \frac{mM}{f \times h^4} < 5.8. \qquad (5)$$

By satisfying the condition (5), the spherical aberration caused by temperature changes can be more suitably suppressed while securing an adequate light amount. When the intermediate term of the condition (5) gets smaller than the lower limit of the condition (5), correction for the spherical aberration due to temperature changes becomes insufficient. When the intermediate term of the condition (5) gets larger than the upper limit of the condition (5), correction for the spherical aberration due to temperature changes becomes excessive. In this case, the diffraction effect becomes too strong, and therefore loss of light amount becomes large.

In at least one aspect, the diffraction order m is a first order.

In this case, the depth of each step does not become too deep, and therefore a transferring failure during a molding process becomes hard to occur. This is advantageous in regard to securing of an adequate light amount.

In at least one aspect, when d (unit: mm) represents a distance between the coupling lens and the objective lens, the optical system of an optical pick-up may satisfy a condition $$8 < d < 25 \qquad (6).$$

When d gets smaller than the lower limit of the condition (6), it becomes difficult to secure space for allowing the coupling lens to move. When d gets larger than the upper limit of the condition (6), space for accommodating the optical system of an optical pick-up becomes large, and therefore the size of the optical information recording/reproducing apparatus becomes large. Furthermore, in this case, the spherical aberration due to temperature changes becomes large.

According to another aspect of the invention, there is provided an optical information recording/reproducing apparatus for recording information to and/or reproducing information from an optical disc based on a predetermined standard, which is provided with a light source that emits a light beam having a wavelength λ, one of the above described optical systems of an optical pick-up, and a signal processing unit configured to detect a returning light beam returning from a recording surface of the optical disc and to execute predetermined signal processing on the returning light beam.

By satisfying the conditions (1) to (3), it becomes possible to suppress variation of the amount of spherical aberration due to temperature changes while securing an adequate working distance. Furthermore, decrease of light amount due to deterioration of the optical performance and a transferring failure becomes hard to occur. Furthermore, since there is no necessity to move the coupling lens to correct the spherical aberration when the temperature change occurs, a moving range of the coupling lens can be set to a small value, which is advantageous in regard to downsizing of the optical system of an optical pick-up.

BRIEF DESCRIPTION OF THE ACCOMPANYING DRAWINGS

FIG. 1 is a block diagram of the optical information recording/reproducing apparatus on which am optical system of an optical pick-up according to an embodiment of the invention is installed.

Figure 2B:
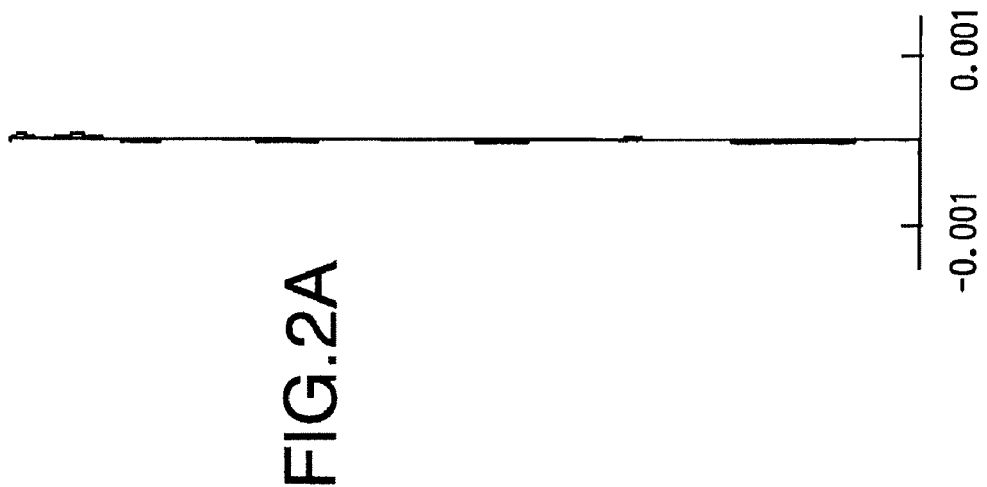
Figure 2A:
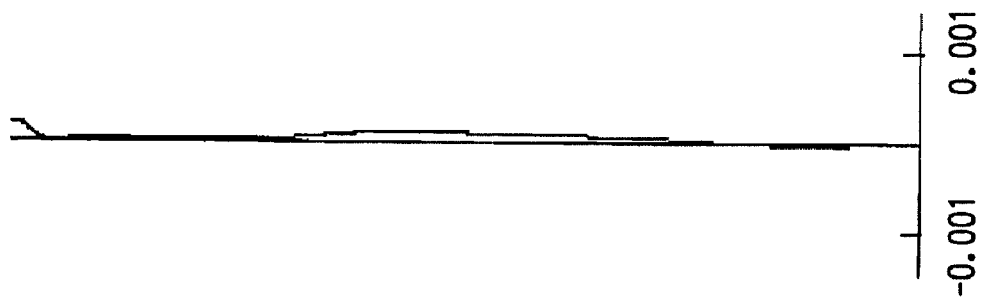

FIG. 2A is a graph illustrating the spherical aberration caused when information recording/reproducing is executed for an optical disc D in the optical information recording/reproducing apparatus according to a first example under a design reference temperature condition, and FIG. 2B is a graph illustrating the spherical aberration caused when the information recording/reproducing is executed for the optical disc D in the optical information recording/reproducing apparatus according to the first example under a condition where the temperature is 30° C. higher than the design reference temperature.

Figure 3B:
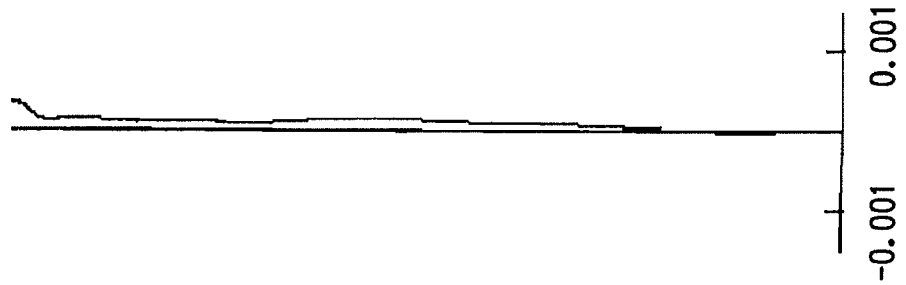
Figure 3A:
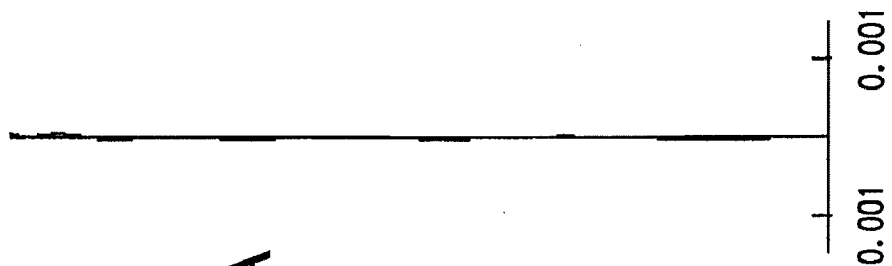

FIG. 3A is a graph illustrating the spherical aberration caused when information recording/reproducing is executed for an optical disc D in the optical information recording/reproducing apparatus according to a second example under a design reference temperature condition, and FIG. 3B is a graph illustrating the spherical aberration caused when the information recording/reproducing is executed for the optical disc D in the optical information recording/reproducing apparatus according to the second example under a condition where the temperature is 30° C. higher than the design reference temperature.

Figure 4B:
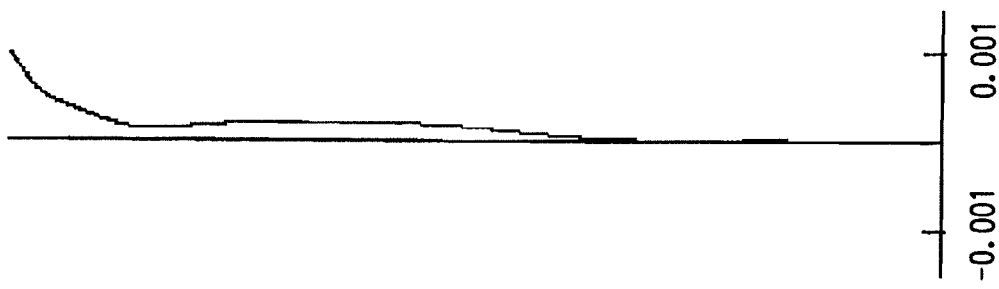
Figure 4A:

FIG. 4A is a graph illustrating the spherical aberration caused when information recording/reproducing is executed for an optical disc D in the optical information recording/reproducing apparatus according to a third example under a design reference temperature condition, and FIG. 4B is a graph illustrating the spherical aberration caused when the information recording/reproducing is executed for the optical disc D in the optical information recording/reproducing apparatus according to the third example under a condition where the temperature is 30° C. higher than the design reference temperature.

Figure 5B:
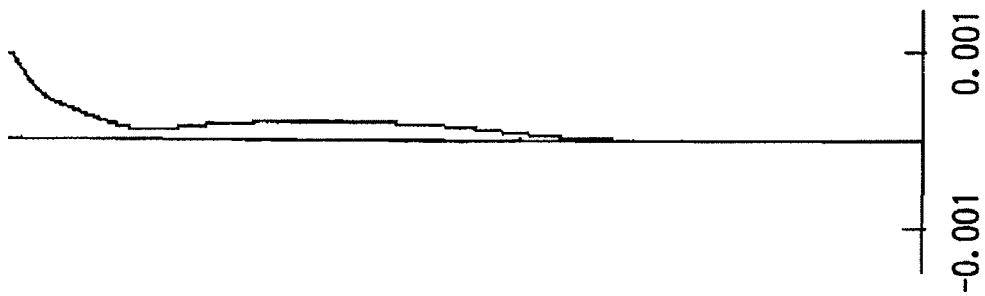
Figure 5A:
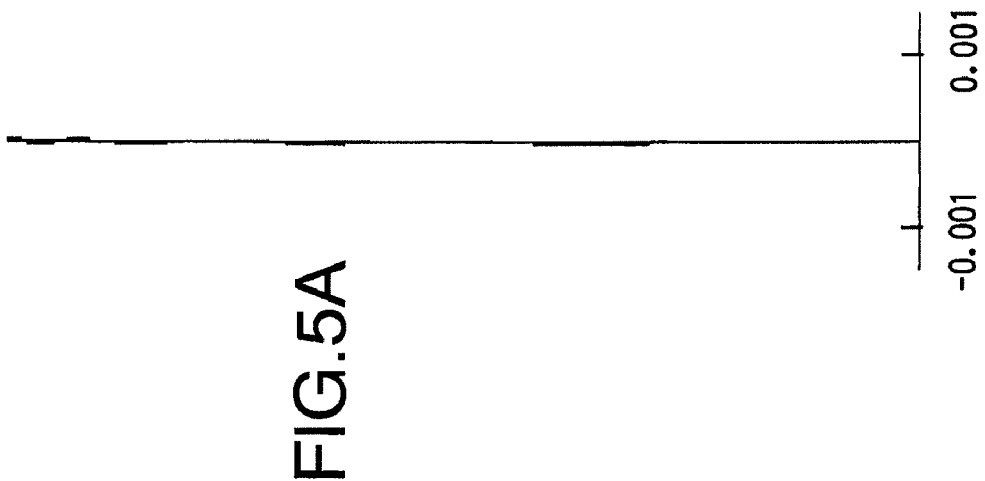

FIG. 5A is a graph illustrating the spherical aberration caused when information recording/reproducing is executed for an optical disc D in the optical information recording/reproducing apparatus according to a fourth example under a design reference temperature condition, and FIG. 5B is a graph illustrating the spherical aberration caused when the information recording/reproducing is executed for the optical disc D in the optical information recording/reproducing apparatus according to the fourth example under a condition where the temperature is 30° C. higher than the design reference temperature.

Figure 6B:
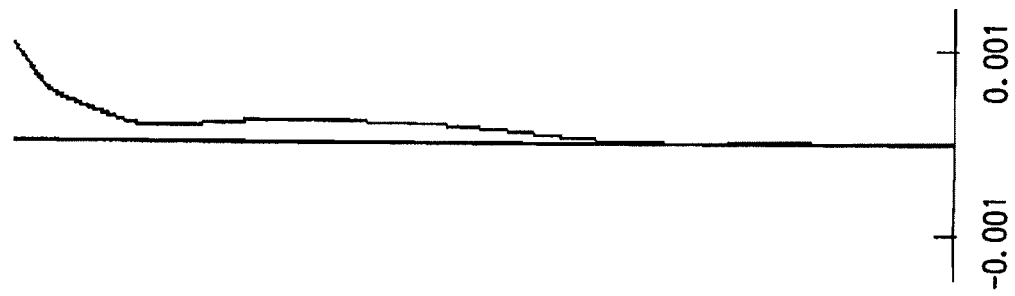
Figure 6A:

FIG. 6A is a graph illustrating the spherical aberration caused when information recording/reproducing is executed for an optical disc D in the optical information recording/reproducing apparatus according to a fifth example under a design reference temperature condition, and FIG. 6B is a graph illustrating the spherical aberration caused when the information recording/reproducing is executed for the optical disc D in the optical information recording/reproducing apparatus according to the fifth example under a condition where the temperature is 30° C. higher than the design reference temperature.

Figure 7B:
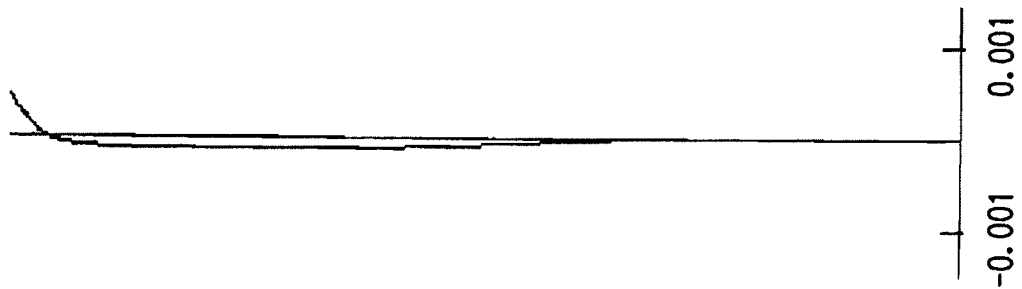
Figure 7A:

FIG. 7A is a graph illustrating the spherical aberration caused when information recording/reproducing is executed for an optical disc D in the optical information recording/reproducing apparatus according to a sixth example under a design reference temperature condition, and FIG. 7B is a graph illustrating the spherical aberration caused when the information recording/reproducing is executed for the optical disc D in the optical information recording/reproducing apparatus according to the sixth example under a condition where the temperature is 30° C. higher than the design reference temperature.

Figure 8A:
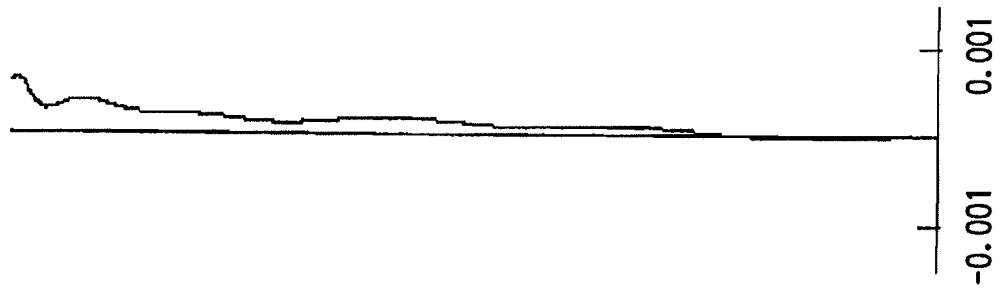
Figure 8B:

FIG. 8A is a graph illustrating the spherical aberration caused when information recording/reproducing is executed for an optical disc D in the optical information recording/reproducing apparatus according to a seventh example under a design reference temperature condition, and FIG. 8B is a graph illustrating the spherical aberration caused when the information recording/reproducing is executed for the optical disc D in the optical information recording/reproducing apparatus according to the seventh example under a condition where the temperature is 30° C. higher than the design reference temperature.

Figure 9B:
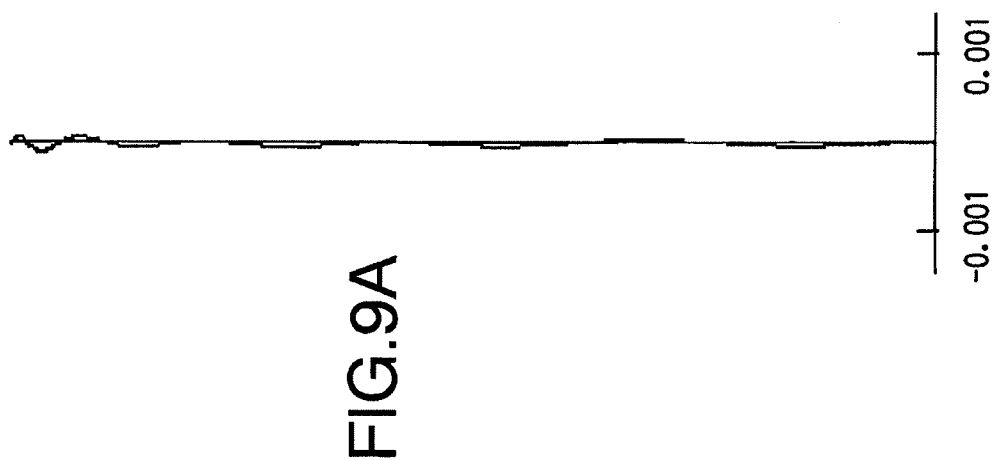
Figure 9A:
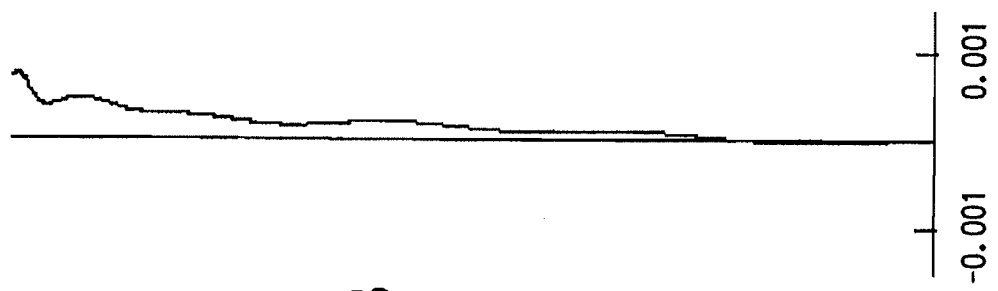

FIG. 9A is a graph illustrating the spherical aberration caused when information recording/reproducing is executed for an optical disc D in the optical information recording/reproducing apparatus according to a eighth example under a design reference temperature condition, and FIG. 9B is a graph illustrating the spherical aberration caused when the information recording/reproducing is executed for the optical disc D in the optical information recording/reproducing apparatus according to the eighth example under a condition where the temperature is 30° C. higher than the design reference temperature.

Figure 10B:
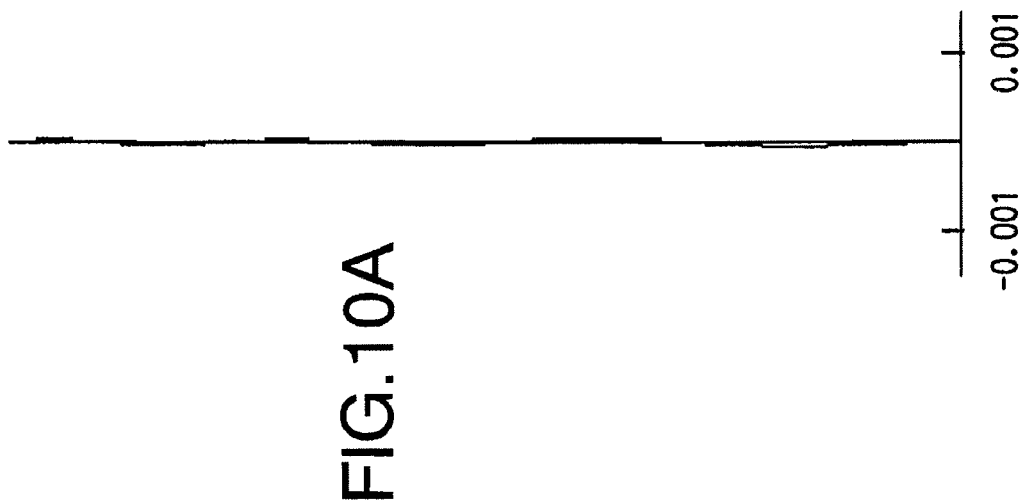
Figure 10A:
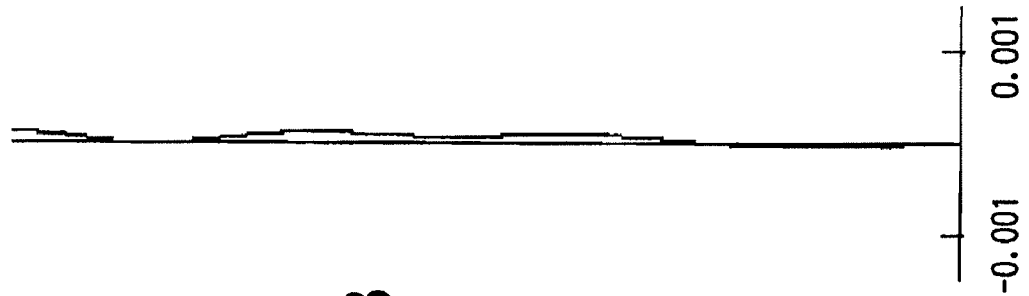

FIG. 10A is a graph illustrating the spherical aberration caused when information recording/reproducing is executed for an optical disc D in the optical information recording/reproducing apparatus according to a ninth example under a design reference temperature condition, and FIG. 10B is a graph illustrating the spherical aberration caused when the information recording/reproducing is executed for the optical disc D in the optical information recording/reproducing apparatus according to the ninth example under a condition where the temperature is 30° C. higher than the design reference temperature.

Figure 11B:
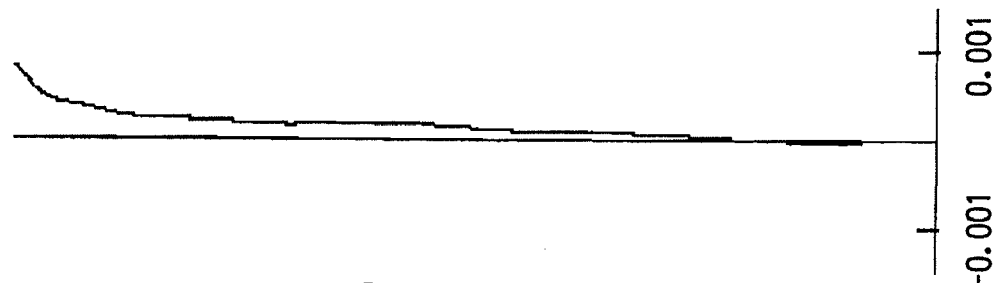
Figure 11A:
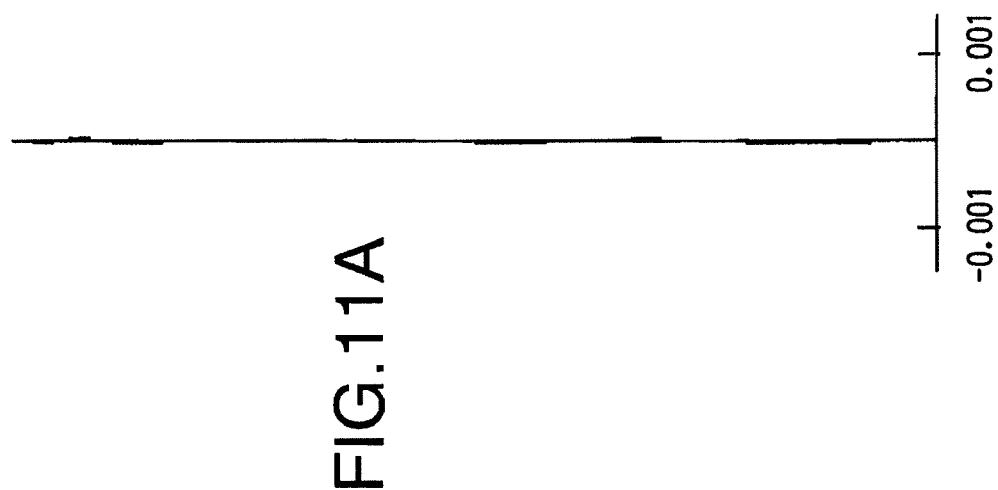

FIG. 11A is a graph illustrating the spherical aberration caused when information recording/reproducing is executed for an optical disc D in the optical information recording/reproducing apparatus according to a tenth example under a design reference temperature condition, and FIG. 11B is a graph illustrating the spherical aberration caused when the information recording/reproducing is executed for the optical disc D in the optical information recording/reproducing apparatus according to the tenth example under a condition where the temperature is 30° C. higher than the design reference temperature.

Figure 12B:
Figure 12A:

FIG. 12A is a graph illustrating the spherical aberration caused when information recording/reproducing is executed for an optical disc D in the optical information recording/reproducing apparatus according to a comparative example under a design reference temperature condition, and FIG. 12B is a graph illustrating the spherical aberration caused when the information recording/reproducing is executed for the optical disc D in the optical information recording/reproducing apparatus according to the comparative example under a condition where the temperature is 30° C. higher than the design reference temperature.

DETAILED DESCRIPTION OF THE EMBODIMENTS

Hereinafter, an embodiment according to the invention is described with reference to the accompanying drawings.

An optical information recording/reproducing apparatus 100 according to the embodiment of the invention is configured to record information to and/ore reproduce information from a high recording density optical disc based on a predetermined standard. In this embodiment, the predetermined standard is BD, and hereafter a high recording density optical disc based on BD is referred to as an optical disc D.

FIG. 1 is a block diagram of the optical information recording/reproducing apparatus 100 on which am optical system of an optical pick-up according to the embodiment of the invention is installed. As show in FIG. 1, the optical information recording/reproducing apparatus 100 includes a light source 1, a half mirror 2, a coupling lens 3, a photoreceptor 4 and an objective lens 10. A chain line show in FIG. 1 represents a reference axis AX of the optical information recording/reproducing apparatus 100. In FIG. 1, a solid line represents a laser beam proceeding toward the optical disc D or a returning light beam returning from the optical disc D. In a normal state, an optical axis of the objective lens 10 coincides with the reference axis AX. However, there is a case where the optical axis of the objective lens 10 shifts from the reference axis AX, for example, for a tracking operation driven by a lens actuator (not show). For example, a numerical aperture NA required for the objective lens 10 is larger than 0.8.

The light source 1 is a semiconductor laser which emits blue laser light having a wavelength λ (unit: nm). As shown in FIG. 1, a laser beam emitted by the light source 1 is deflected by the half mirror 2, and then is incident on a first surface 3a of the coupling lens 3.

The optical disc D has a multilayer structure, for example, having multiple recording surfaces M1 to M3. The recording surfaces M1 to M3 have different optical distances from a surface of a protective layer. In the following, an optical distance from the surface of the protective layer to each recording surface for recording or reproducing is refereed to as a "disc thickness".

That is, different disc thicknesses are respectively defined for the recording surfaces M1 to M3. Due to the difference in disc thickness (i.e., depending on which of the recording surfaces M1 to M3 is used for recording or reproducing), the spherical aberration changes. For this reason, in this embodiment, the coupling lens 3 is arranged to be movable in the direction of the reference axis AX by a driving mechanism (not show). A moving amount of the coupling lens 3 is predetermined for each of the recording surfaces M1 to M3 used for recording or reproducing. Depending on the moving amount of the coupling lens 3 in the direction of the reference axis AX, the coupling lens 3 changes the diverging angle of the laser beam emerging from a second surface 3b of the coupling lens 3. By changing the diverging angle of the laser beam, the amount of spherical aberration which varies depending on the difference in disc thickness can be canceled.

The coupling lens 3 is controlled to move for canceling the spherical aberration caused by the difference in disc thickness, a wavelength shift of the laser beam emitted by the light source 1, and a manufacturing error of the objective lens 10. However, the coupling lens 3 does not move to correct the spherical aberration caused by the temperature changes.

The laser beam emerging from the second surface 3b of the coupling lens 3 is then incident on a first surface 10a of the objective lens 10. The laser beam which has entered the objective lens 10 through the first surface 10a exits from a second surface 10b of the objective lens 10, and is converged by the objective lens 10 in the vicinity of the recording surface of the optical disc D so that the laser beam forms a suitable beam spot where the aberrations are corrected, on the recoding surface of the optical disc D. The laser beam (returning laser beam) which has reflected from the recording surface of the optical disc D proceeds along the same path along which the laser beam from the light source 1 proceeds toward the optical disc D, and is received by the photoreceptor 4 through the half mirror 2.

The photoreceptor 4 executes photoelectric conversion with respect to received light, and outputs an analog signal to a signal processing circuit 15. The signal processing circuit 15 converts the analog signal into a bit stream and executes an error correction process for the inputted signal. Then, the signal processing circuit 15 divides the bit stream for which the error correction has been executed, into various types of streams including an audio stream and a video stream, and decodes each divided stream. The signal processing circuit 15 converts an audio signal and a video signal which are obtained by decoding the streams into analog signals, and outputs the analog signals to a speaker and a display (not shown), respectively. Consequently, sound and video recorded on the optical disc D are reproduced through the speaker and the display, respectively.

Since the objective lens 10 is molded with resin, the objective lens 10 has advantageous, in comparison with a glass lens, in regard to various aspects including a load to be placed on a driving actuator for a lens, mass productivity and manufacturing cost. However, the objective lens 10 has a drawback in regard to the spherical aberration because the objective lens is a resin lens having a high NA. Although the objective lens 10 has such a drawback, in this embodiment the objective lens 10 is configured to suitably suppress variation of the amount of spherical aberration due to the temperature changes. For this reason, according to the embodiment, a temperature compensation mechanism in which the coupling lens is arranged to be movable can be omitted. That is, the configuration of optical information recording/reproducing apparatus 100 according to the embodiment is advantageous in regard to simplification of configuration, shortening of the moving range of the coupling lens 3, and downsizing of the optical information recording/reproducing apparatus 100. It should be noted that in this embodiment the coupling lens 3 is also a resin lens, and therefore the coupling lens 3 has advantages, in regard to the above described various aspects, in comparison with a glass lens.

Each of the first and second surfaces 10a and 10b of the objective lens 10 is an aspherical surface. A shape of an aspherical surface is expressed by a following equation:

$$SAG = \frac{\frac{h^2}{r}}{1+\sqrt{1-(1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), κ is a conical coefficient, and $A_4$, $A_6$, ... represent aspherical coefficients larger than or equal to the fourth order.

By configuring each of the first and second surfaces 10a and 10b of the objective lens 10 as an aspherical surface, it becomes possible to appropriately control the aberrations including the spherical aberration and the coma. In this embodiment, each of the first and second surfaces 3a and 3b of the coupling lens 3 is formed to be an aspherical surface so that the aberrations can be corrected.

When f (unit: mm) represents a focal length of the objective lens 10 at use wavelength λ, f' (unit: mm) represents a focal length of the coupling lens 3 at the use wavelength λ, β represents a magnification of an optical system of an optical pick-up including the coupling lens 3 and the objective lens 10 with respect to the use wavelength λ, β can be expressed as −f/f' (i.e., (focal length on the object side of the objective lens 10)/(focal length on the image side of the coupling lens 3)). In this case, the following conditions (1) and (2) are satisfied.

$$-0.13 < \beta < -0.08 \tag{1}$$

$$1.15 < f < 1.50 \tag{2}$$

The focal lengths are assigned a negative sign for the object side, and are assigned a positive sign for the image side.

The condition (1) defines the magnification of the optical system of an optical pick-up. When β gets smaller than the lower limit of the condition (1), the amount of aberration with respect to an installing error of the coupling lens 3 becomes large. Furthermore, in this case, since the incidence side NA of the coupling lens 3 becomes large, the light amount in the peripheral part in the effective beam diameter of the coupling lens 3 becomes small, and therefore the rim intensity (a ratio of the intensity of light passing through a peripheral part of an objective lens to the intensity of light passing through a central part close to an optical axis of the objective lens) decreases. Due to decrease of the rim intensity, the diameter of the beam spot formed on the recording surface of the optical disc D becomes large, which is disadvantageous in regard to information recording and reproducing for the optical disc D. When β gets larger than the upper limit of the condition (1), it becomes necessary to place the light source 1 and the coupling lens 3 away from each other, which is disadvantageous in regard to downsizing of the optical system of an optical pick-up and securing of an adequate light amount. In addition, in this case the required driving amount for the coupling lens 3 for correction of the spherical aberration due to, for example, the difference in protective layer thickness of the optical disc increases, which also causes increase of the size of the optical information recording/reproducing apparatus 100.

The condition (2) defines the focal length of the objective lens 10. When f gets lower than the smaller limit of the condition (2), it becomes difficult to secure an adequate working distance WD between the surface of the protective layer of the optical disc D and the second surface 10b of the objective lens 10, and it also becomes difficult to secure an adequate moving amount of the coupling lens 3. When f gets larger than the upper limit of the condition (2), a problem arises that downsizing of the optical system of an optical pick-up becomes difficult, and the amount of spherical aberration due to the temperature changes becomes large.

As shown in FIG. 1, an annular zone structure is formed on the first surface 10a of the objective lens 4. The annular zone structure has a plurality of refractive surfaces zones (annular zones) concentrically formed about the optical axis of the objective lens 10. The plurality of annular zones are divided by minute steps extending in parallel with the optical axis of the objective lens 10. The annular zone structure may be formed only on the second surface 10b of the objective lens 10, or may be formed on both of the first and second surfaces 10a and 10b of the objective lens 10.

By providing the annular zone structure on the first surface 10a (not on the second surface 10b) of the objective lens 10, the following advantages can be obtained. For example, it becomes possible to increase the minimum annular zone width of the annular zone structure. In this case, the loss of light amount by each step portion formed between adjacent ones of the annular zones with respect to the effective light beam width can be suppressed. Furthermore, the optical surface (first surface 10a) on which the annular zone structure is formed does not face the optical disc D being rotated, and the possibility that dust is adhered to the optical surface (i.e., the first surface 10a) on which the annular zone structure is formed can be suppressed. Furthermore, the possibility that the lens is worn by brushing by a lens cleaner can be prevented.

Each step of the annular zone structure is formed to generate a predetermined optical path length difference between a light beam passing through the inside of a boundary between adjacent ones of the annular zones and a light beam passing through the outside of the boundary. In general, such an annular zone structure can be expressed as a diffraction structure. The annular zone structure formed such that the predetermined optical path length difference is n-times (n: integer) as large as a particular wavelength α can be expressed as an n-th order diffraction structure having the blazed wavelength of α. A diffraction order of diffracted light at which the diffraction efficiency is maximized when a light beam having a particular wavelength γ passes through the diffraction structure can be obtained as an integer m which is closest to a value defined by dividing an optical path length difference given to the light beam having the wavelength γ by the wavelength γ.

In addition, the fact that the optical path length difference is generated between a light beam passing through the inside of a boundary between adjacent ones of the annular (refractive) zones and a light beam passing through the outside of the boundary can be considered as a phenomenon that phases of the light beams are shifted with respect to each other by the effect of each step of the annular zone structure. Therefore, the annular zone structure can be expressed as a structure for shifting phases of incident light beams (i.e., a phase shift structure).

The annular zone structure can be expressed by an optical path difference function $\phi(h)$. The optical path difference function $\phi(h)$ is a function representing the functional capability of the objective lens 10 (a diffraction lens) in a form of an additional optical path length at the height h from the optical axis of the objective lens 10. The optical path difference function $\phi(h)$ can be expressed by a following equation:

$$\phi i(h) = (P_2 \times h^2 + P_4 \times h^4 + P_6 \times h^6 + P_8 \times h^8 + P_{10} \times h^{10} + P_{12} \times h^{12})m\lambda$$

where $P_2, P_4, P_6 \ldots$ represent coefficients of the $2^{nd}$ order, $4^{th}$ order, $6^{th}$ order, h represents a height from the optical axis, m represents a diffraction order at which the diffraction efficiency of the incident laser beam is maximized, and $\lambda$ represents a design wavelength of the laser beam being used.

When ($\Sigma\phi_{0.00-1.00}$) represents the sum of absolute values of the heights of all the steps of the annular zone structure formed within the effective beam diameter on the first surface 10a, ($\Sigma\phi_{0.95-1.00}$) represents the sum of absolute values of the heights of all the steps of the annular zone structure formed within the range of 95% to 100% of an effective beam radius with respect to the optical axis, n represents the refractive index of the objective lens 10 at the use wavelength $\lambda$, $d_0$ (unit: mm) represents the thickness of the objective lens 10 defined on the optical axis, $P_{ave}$ represents an average of distances between adjacent ones of the steps formed within the range of 95% to 100% of the effective beam radius, $\theta$ represents a maximum angle of angles formed, within the range of 95% to 100% of the effective beam radius, between a normal to the first surface 10a and a line parallel with the optical axis, L represents an absolute value of the height of a step formed at a position corresponding to the maximum angle, $L_0$ represents an absolute value of the height of a step formed at a position corresponding to the optical axis, and m represents a diffraction order at which the diffraction efficiency is maximized for the laser beam having the use wavelength $\lambda$ incident on the first surface 10a, a following condition (3) is satisfied.

$$0.065 < \frac{\left(\frac{\sum \Phi_{0.95-1.00}}{\sum \Phi_{0.00-1.00}}\right) \times \frac{d_0 \times n}{f^2 \times \left(\frac{NA}{0.85}\right)^4}}{P_{ave} + \frac{1}{L}} < 0.100 \quad (3)$$

where $$L = L_0 + (1 - \cos\theta)$$

$$L_0 = \frac{m\lambda}{n-1}$$

The condition (3) defines an amount relating to steps (i.e., an amount reflecting both of the heights of the steps and the number of steps) of the annular zone structure in the peripheral part of the objective lens 10. When the intermediate term of the condition (3) gets smaller than the lower limit of the condition (3), the diffracting effect defined by the relationship between the diffraction order and the number of steps becomes too weak, and therefore it becomes impossible to sufficiently correct the spherical aberration caused by the temperature changes. When the intermediate term of the condition (3) gets larger than the upper limit of the condition (3), the diffracting effect becomes too strong, and therefore correction for the spherical aberration due to the temperature changes becomes excessive. Furthermore, in this case, the amount relating to steps in the peripheral part of the objective lens 10 increases. Therefore, the loss of light amount due to a molding error becomes large. As a result, it becomes difficult to secure an adequate amount of light. Furthermore, in this case, the annular zone width becomes too narrow in the peripheral part of the effective beam radius. Therefore, the light beam passing through the peripheral part of the effective beam diameter is blocked and the loss of light amount is caused. Consequently, it becomes difficult to secure an adequate amount of light.

By satisfying the conditions (1) to (3), it becomes possible to suppress variation of the amount of spherical aberration due to temperature changes while securing an adequate working distance WD. Furthermore, decrease of the light amount due to deterioration of the optical performance and a transferring failure of the annular zone structure becomes hard to occur. In addition, since an adequate annular zone width can be secured in the peripheral part of the effective beam diameter, it is possible to effectively prevent the annular zone structure itself from blocking the light beam. Furthermore, since there is no necessity to move the coupling lens 3 to correct the spherical aberration when the temperature change occurs, the moving range of the coupling lens 3 becomes small. This is advantageous in regard to downsizing of the optical information recording/reproducing apparatus 100. Furthermore, by providing the annular zone structure for the objective lens 10, it becomes possible to decrease dependency of the spherical aberration with respect to the refractive index, and thereby the individual differences of products caused by the difference of lot numbers and variations in molding conditions can be suppressed.

The optical system of an optical pick-up including the coupling lens 3 and the objective lens 10 is configured to satisfy a condition:

$$-60 < \frac{D}{f \times (1-\beta) \times \Delta t} < -20 \quad (4)$$

where D (unit: mm) represents the moving amount of the coupling lens 3 necessary for correcting the spherical aberration caused by the difference in disc thickness, and $\Delta t$ (unit: mm) represents the change amount of the disc thickness. In this case, the moving amount D is negative when the coupling lens 3 moves in the direction deviating from the light source 1, and is positive when the coupling lens 3 moves in the direction approaching to the light source 1. The change amount $\Delta t$ is negative when the optical distance changes to become short, and is positive when the optical distance changes to become long.

The condition (4) defines the moving amount of the coupling lens 3 to correct the spherical aberration due to the difference in disc thickness. By satisfying the condition (4), the spherical aberration caused by the difference in disc thickness can be suitably corrected. When the intermediate term of the condition (4) gets smaller than the lower limit of the condition (4), correction for the spherical aberration tends to become insufficient. When the intermediate term of the condition (4) gets larger than the upper limit of the condition (4), correction for the spherical aberration tends to become excessive. In this case, since the moving amount of the coupling lens 3 becomes large, downsizing of the optical information recording/reproducing apparatus 100 becomes difficult to realize.

When M represents the number of steps of the annular zone structure formed on the first surface 10*a* within the effective beam diameter, and h represents the effective beam radius, the following condition (5) is satisfied.

$$2.0 < \frac{mM}{f \times h^4} < 5.8. \quad (5)$$

The condition (5) relates to the diffracting effect defined by the relationship between the diffraction order and the number of steps of the annular zone structure. By satisfying the condition (5), the spherical aberration caused by temperature changes can be more suitably suppressed while securing an adequate light amount. When the intermediate term of the condition (5) gets smaller than the lower limit of the condition (5), correction for the spherical aberration due to temperature changes becomes insufficient. When the intermediate term of the condition (5) gets larger than the upper limit of the condition (5), correction for the spherical aberration due to temperature changes becomes excessive. In this case, the diffraction effect becomes too strong, and therefore loss of light amount becomes large.

In order to more suitably achieve the advantages of the embodiment of the invention, it is preferable to set the diffraction order m for the first order. By setting the diffraction order m for the first order, the depth of each step does not become too deep, and therefore a transferring failure during a molding process becomes hard to occur. This is advantageous in regard to securing of an adequate light amount.

The distance d (unit: mm) between the coupling lens 3 and the objective lens 10 satisfies the following condition (6).

$$8 < d < 25 \quad (6)$$

When d gets smaller than the lower limit of the condition (6), it becomes difficult to secure space for allowing the coupling lens 3 to move. When d gets larger than the upper limit of the condition (6), space for accommodating the optical system of an optical pick-up becomes large, and therefore the size of the optical information recording/reproducing apparatus 100 becomes large. Furthermore, in this case, the spherical aberration due to temperature changes becomes large.

In the following, ten concrete examples of the optical information recording/reproducing apparatus 100 according to the embodiment are explained. Since the differences in shape between the ten examples are extremely small and can not be expressed by the drawings, the configuration of the optical information recording/reproducing apparatus 100 shown in FIG. 1 is used as a representative configuration of each of the ten examples.

First Example

Hereafter, a first example of the optical information recording/reproducing apparatus 100 is described. The specifications of the optical system of an optical pick-up including the coupling lens 3 and the objective lens 10 according to the first example are indicated below. Specifically, the specifications include f' representing the focal length of the coupling lens 3, f representing the focal length of the objective lens 10, NA, the wavelength $\lambda$ of the laser beam emitted by the light source 1, the magnification $\beta$ of the optical system of an optical pick-up and the diffraction order m.

f': 12.00
f: 1.41
NA: 0.85
$\lambda$: 405
$\beta$: −0.118
m: 1

Table 1 shows a specific numerical configuration of the optical information recording/reproducing apparatus 100 according to the first example defined when the optical disc D is used.

TABLE 1

| Surface No. | r | $d_0$ | $n_0$ | νd | $n_{T+30°\,C.}$ |
|---|---|---|---|---|---|
| 0 | | −0.500 | | | |
| 1 | ∞ | 2.750 | 1.5397 | 64 | 1.5397 |
| 2 | ∞ | 9.113 | | | |
| 3 | 72.500 | 1.000 | 1.5602 | 56 | 1.5569 |
| 4 | −7.370 | 15 | | | |
| 5 | 0.899 | 1.800 | 1.5602 | 56 | 1.5569 |
| 6 | −1.537 | 0.389 | | | |
| 7 | ∞ | 0.0875 | 1.6223 | 29 | 1.6190 |
| 8 | ∞ | | | | |

In Table 1 (and in the following similar Tables), surface #0 represents an exit surface of the light source 1, surfaces #1 and #2 collectively represent optical components arranged between the light source 1 and the coupling lens 3 (e.g., a cover glass, a beam splitter and a grating (in FIG. 1 only the half mirror 2 is illustrated)), surfaces #3 and #4 respectively represent the first and second surfaces 3a and 3b of the coupling lens 3, surfaces #5 and #6 respectively represent the first and second surfaces 10a and 10b of the objective lens 10, and surfaces #7 and #8 respectively represent the surface of the protective layer and the recording surface M1 of the optical disc D. In Table 1 (and in the following similar Tables), "r" denotes the curvature radius (unit: mm) of each optical surface, and "$d_0$" denotes the thickness of an optical component or the distance (unit: mm) from each optical surface to the next optical surface, "$n_0$" represents the refractive index at the wavelength λ being used, "vd" represents Abbe number at d-line, and "$n_{T+30°\,C.}$" represents the refractive index of each optical component at the wavelength λ when the ambient temperature is higher by 30° C. than the design reference temperature (room temperature). For an aspherical optical element, "r" represents the curvature radius on the optical axis. The wavelength fluctuation depending on the temperature change at the wavelength λ is 0.06 nm/° C.

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 2 shows the conical coefficients κ and aspherical coefficients $A_4, A_6 \ldots$ of each aspherical surface. In Table 2 (and in the following similar Tables), the notation "E" means the power of 10 with an exponent specified by the number to the right of E (e.g. "E-04" means "×$10^{-4}$").

TABLE 2

| Surface | 3 | 4 | 5 | 6 |
|---|---|---|---|---|
| κ | 0.00000 | 0.00000 | −0.64000 | 0.00000 |
| A4 | −2.47000E−05 | 2.00000E−04 | 2.07430E−02 | 1.84720E+00 |
| A6 | | 2.65000E−06 | 2.64080E−04 | −8.24370E+00 |
| A8 | | 4.00000E−08 | 3.81320E−02 | 2.93920E+01 |
| A10 | | | −1.27580E−01 | −7.20910E+01 |
| A12 | | | 2.32190E−01 | 1.13910E+02 |
| A14 | | | −2.42410E−01 | −1.09730E+02 |
| A16 | | | 1.34740E−01 | 5.79300E+01 |
| A18 | | | −3.05300E−02 | −1.25960E+01 |

On the first surface 10a (surface #5) of the objective lens 10, the annular zone structure is provided. The following Table 3 shows the coefficients of the optical path difference function φ(h) defining the annular zone structure.

TABLE 3

| Surface | 5 |
|---|---|
| P2 | 3.50000E+01 |
| P4 | −5.00000E+00 |
| P6 | −1.00000E+01 |
| P8 | −8.50000E+00 |

FIG. 2A is a graph illustrating the spherical aberration caused when the information recording or information reproducing is executed for the optical disc D in the optical information recording/reproducing apparatus 100 according to the first example under a design reference temperature condition (i.e., room temperature). FIG. 2B is a graph illustrating the spherical aberration caused when the information recording or information reproducing is executed for the optical disc D in the optical information recording/reproducing apparatus 100 according to the first example under a condition where the temperature is 30° C. higher than the design reference temperature (room temperature). In each of FIGS. 2A and 2B (and in the following similar tables), the vertical axis represents the pupil coordinate, and the horizontal axis represents the amount of spherical aberration (unit: mm).

Second Example

Hereafter, a second example of the optical information recording/reproducing apparatus 100 is described. The specifications of the optical system of an optical pick-up including the coupling lens 3 and the objective lens 10 according to the second example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 17.00 f: 1.41

NA: 0.85

λ: 405

β: −0.083 m: 1

Table 4 shows a specific numerical configuration of the optical information recording/reproducing apparatus 100 according to the second example defined when the optical disc D is used.

TABLE 4

| Surface No. | r | $d_0$ | $n_0$ | vd | $n_{T+30°\,C.}$ |
|---|---|---|---|---|---|
| 0 | | −0.500 | | | |
| 1 | ∞ | 2.750 | 1.5397 | 64 | 1.5397 |
| 2 | ∞ | 14.109 | | | |
| 3 | 119.000 | 1.000 | 1.5602 | 56 | 1.5569 |
| 4 | −10.320 | 15 | | | |
| 5 | 0.899 | 1.800 | 1.5602 | 56 | 1.5569 |
| 6 | −1.537 | 0.389 | | | |
| 7 | ∞ | 0.0875 | 1.6223 | 29 | 1.6190 |
| 8 | ∞ | | | | |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 5 shows the conical coefficients κ and aspherical coefficients $A_4, A_6 \ldots$ of each aspherical surface.

TABLE 5

| Surface | 3 | 4 | 5 | 6 |
|---|---|---|---|---|
| κ | 0.00000 | 0.00000 | −0.64000 | 0.00000 |
| A4 | −6.91000E−06 | 7.32000E−05 | 2.07430E−02 | 1.84720E+00 |
| A6 | | 5.20000E−07 | 2.64080E−04 | −8.24370E+00 |
| A8 | | 4.00000E−08 | 3.81320E−02 | 2.93920E+01 |
| A10 | | | −1.27580E−01 | −7.20910E+01 |
| A12 | | | 2.32190E−01 | 1.13910E+02 |
| A14 | | | −2.42410E−01 | −1.09730E+02 |
| A16 | | | 1.34740E−01 | 5.79300E+01 |
| A18 | | | −3.05300E−02 | −1.25960E+01 |

On the first surface 10a (surface #5) of the objective lens 10, the annular zone structure is provided. The following Table 3 shows the coefficients of the optical path difference function φ(h) defining the annular zone structure.

TABLE 6

| Surface | 5 |
|---|---|
| P2 | 3.50000E+01 |
| P4 | −5.00000E+00 |
| P6 | −1.00000E+01 |
| P8 | −8.50000E+00 |

FIG. 3A is a graph illustrating the spherical aberration caused when the information recording or information reproducing is executed for the optical disc D in the optical information recording/reproducing apparatus 100 according to the second example under a design reference temperature condition (i.e., room temperature). FIG. 3B is a graph illustrating the spherical aberration caused when the information recording or information reproducing is executed for the optical disc D in the optical information recording/reproducing apparatus 100 according to the second example under a condition where the temperature is 30° C. higher than the design reference temperature (room temperature).

Third Example

Hereafter, a third example of the optical information recording/reproducing apparatus 100 is described. The specifications of the optical system of an optical pick-up including the coupling lens 3 and the objective lens 10 according to the third example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 12.00
f: 1.18
NA: 0.85
λ: 405
β: −0.098
m: 1

Table 7 shows a specific numerical configuration of the optical information recording/reproducing apparatus 100 according to the third example defined when the optical disc D is used.

TABLE 7

| Surface No. | r | $d_0$ | $n_0$ | νd | $n_{T+30° C.}$ |
|---|---|---|---|---|---|
| 0 | | −0.500 | | | |
| 1 | ∞ | 2.750 | 1.5397 | 64 | 1.5397 |
| 2 | ∞ | 9.113 | | | |
| 3 | 72.500 | 1.000 | 1.5602 | 56 | 1.5569 |
| 4 | −7.370 | 15 | | | |
| 5 | 0.758 | 1.550 | 1.5602 | 56 | 1.5569 |
| 6 | −1.145 | 0.301 | | | |
| 7 | ∞ | 0.0875 | 1.6223 | 29 | 1.6190 |
| 8 | ∞ | | | | |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 8 shows the conical coefficients κ and aspherical coefficients $A_4, A_6 \ldots$ of each aspherical surface.

TABLE 8

| Surface | 3 | 4 | 5 | 6 |
|---|---|---|---|---|
| κ | 0.00000 | 0.00000 | −0.64000 | 0.00000 |
| A4 | −2.47000E−05 | 2.00000E−04 | 3.25650E−02 | 3.43580E+00 |
| A6 | | 2.65000E−06 | 3.26900E−02 | −1.91150E+01 |
| A8 | | 4.00000E−08 | −5.01250E−02 | 7.83860E+01 |
| A10 | | | 1.87950E−01 | −2.20110E+02 |
| A12 | | | −3.18350E−01 | 3.98720E+02 |
| A14 | | | 2.79260E−01 | −4.16870E+02 |
| A16 | | | −1.06300E−01 | 1.90350E+02 |

On the first surface 10a (surface #5) of the objective lens 10, the annular zone structure is provided. The following Table 9 shows the coefficients of the optical path difference function φ(h) defining the annular zone structure.

TABLE 9

| Surface | 5 |
|---|---|
| P2 | 4.50000E+01 |
| P4 | −5.00000E+00 |
| P6 | −1.00000E+01 |
| P8 | −2.50000E+01 |

FIG. 4A is a graph illustrating the spherical aberration caused when the information recording or information reproducing is executed for the optical disc D in the optical information recording/reproducing apparatus 100 according to the third example under a design reference temperature condition (i.e., room temperature). FIG. 4B is a graph illustrating the spherical aberration caused when the information recording or information reproducing is executed for the optical disc D in the optical information recording/reproducing apparatus 100 according to the third example under a condition where the temperature is 30° C. higher than the design reference temperature (room temperature).

Fourth Example

Hereafter, a fourth example of the optical information recording/reproducing apparatus 100 is described. The specifications of the optical system of an optical pick-up including the coupling lens 3 and the objective lens 10 according to the fourth example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 11.00
f: 1.18
NA: 0.85
λ: 405
β: −0.107
m: 1

Table 10 shows a specific numerical configuration of the optical information recording/reproducing apparatus 100 according to the fourth example defined when the optical disc D is used.

TABLE 10

| Surface No. | r | $d_0$ | $n_0$ | vd | $n_{T+30° C.}$ |
|---|---|---|---|---|---|
| 0 |  | −0.500 |  |  |  |
| 1 | ∞ | 2.750 | 1.5397 | 64 | 1.5397 |
| 2 | ∞ | 8.118 |  |  |  |
| 3 | 64.000 | 1.000 | 1.5602 | 56 | 1.5569 |
| 4 | −6.780 | 10 |  |  |  |
| 5 | 0.758 | 1.550 | 1.5602 | 56 | 1.5569 |
| 6 | −1.145 | 0.301 |  |  |  |
| 7 | ∞ | 0.0875 | 1.6223 | 29 | 1.6190 |
| 8 | ∞ |  |  |  |  |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 11 shows the conical coefficients κ and aspherical coefficients $A_4, A_6 \ldots$ of each aspherical surface.

TABLE 11

| Surface | 3 | 4 | 5 | 6 |
|---|---|---|---|---|
| κ | 0.00000 | 0.00000 | −0.64000 | 0.00000 |
| A4 | −3.90000E−05 | 2.52000E−04 | 3.25650E−02 | 3.43580E+00 |
| A6 |  | 4.10000E−06 | 3.26900E−02 | −1.91150E+01 |
| A8 |  | 3.00000E−08 | −5.01250E−02 | 7.83860E+01 |
| A10 |  |  | 1.87950E−01 | −2.20110E+02 |
| A12 |  |  | −3.18350E−01 | 3.98720E+02 |
| A14 |  |  | 2.79260E−01 | −4.16870E+02 |
| A16 |  |  | −1.06300E−01 | 1.90350E+02 |

On the first surface 10a (surface #5) of the objective lens 10, the annular zone structure is provided. The following Table 12 shows the coefficients of the optical path difference function φ(h) defining the annular zone structure.

TABLE 12

| Surface | 5 |
|---|---|
| P2 | 4.50000E+01 |
| P4 | −5.00000E+00 |
| P6 | −1.00000E+01 |
| P8 | −2.50000E+01 |

FIG. 5A is a graph illustrating the spherical aberration caused when the information recording or information reproducing is executed for the optical disc D in the optical information recording/reproducing apparatus 100 according to the fourth example under a design reference temperature condition (i.e., room temperature). FIG. 5B is a graph illustrating the spherical aberration caused when the information recording or information reproducing is executed for the optical disc D in the optical information recording/reproducing apparatus 100 according to the fourth example under a condition where the temperature is 30° C. higher than the design reference temperature (room temperature).

Fifth Example

Hereafter, a fifth example of the optical information recording/reproducing apparatus 100 is described. The specifications of the optical system of an optical pick-up including the coupling lens 3 and the objective lens 10 according to the fifth example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 14.10
f: 1.18
NA: 0.85
λ: 405
β: −0.0834
m: 1

Table 13 shows a specific numerical configuration of the optical information recording/reproducing apparatus 100 according to the fifth example defined when the optical disc D is used.

TABLE 13

| Surface No. | r | $d_0$ | $n_0$ | vd | $n_{T+30°\,C.}$ |
|---|---|---|---|---|---|
| 0 | | −0.500 | | | |
| 1 | ∞ | 2.750 | 1.5397 | 64 | 1.5397 |
| 2 | ∞ | 11.714 | | | |
| 3 | 91.700 | 1.000 | 1.5602 | 56 | 1.5569 |
| 4 | −8.610 | 10 | | | |
| 5 | 0.758 | 1.550 | 1.5602 | 56 | 1.5569 |
| 6 | −1.145 | 0.301 | | | |
| 7 | ∞ | 0.0875 | 1.6223 | 29 | 1.6190 |
| 8 | ∞ | | | | |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 14 shows the conical coefficients κ and aspherical coefficients $A_4, A_6 \ldots$ of each aspherical surface.

TABLE 14

| Surface | 3 | 4 | 5 | 6 |
|---|---|---|---|---|
| κ | 0.00000 | 0.00000 | −0.64000 | 0.00000 |
| A4 | −1.68000E−05 | 1.23000E−04 | 3.25650E−02 | 3.43580E+00 |
| A6 | | 1.24000E−06 | 3.26900E−02 | −1.91150E+01 |
| A8 | | | −5.01250E−02 | 7.83860E+01 |
| A10 | | | 1.87950E−01 | −2.20110E+02 |
| A12 | | | −3.18350E−01 | 3.98720E+02 |
| A14 | | | 2.79260E−01 | −4.16870E+02 |
| A16 | | | −1.06300E−01 | 1.90350E+02 |

On the first surface 10a (surface #5) of the objective lens 10, the annular zone structure is provided. The following Table 15 shows the coefficients of the optical path difference function φ(h) defining the annular zone structure.

TABLE 15

| Surface | 5 |
|---|---|
| P2 | 4.50000E+01 |
| P4 | −5.00000E+00 |
| P6 | −1.00000E+01 |
| P8 | −2.50000E+01 |

FIG. 6A is a graph illustrating the spherical aberration caused when the information recording or information reproducing is executed for the optical disc D in the optical information recording/reproducing apparatus 100 according to the fifth example under a design reference temperature condition (i.e., room temperature). FIG. 6B is a graph illustrating the spherical aberration caused when the information recording or information reproducing is executed for the optical disc D in the optical information recording/reproducing apparatus 100 according to the fifth example under a condition where the temperature is 30° C. higher than the design reference temperature (room temperature).

Sixth Example

Hereafter, a sixth example of the optical information recording/reproducing apparatus 100 is described. The specifications of the optical system of an optical pick-up including the coupling lens 3 and the objective lens 10 according to the sixth example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 14.10
f: 1.18
NA: 0.85
λ: 405
β: −0.083
m: 1

Table 16 shows a specific numerical configuration of the optical information recording/reproducing apparatus 100 according to the sixth example defined when the optical disc D is used.

TABLE 16

| Surface No. | r | $d_0$ | $n_0$ | vd | $n_{T+30°\,C.}$ |
|---|---|---|---|---|---|
| 0 | | −0.500 | | | |
| 1 | ∞ | 2.750 | 1.5397 | 64 | 1.5397 |
| 2 | ∞ | 11.220 | | | |
| 3 | 63.400 | 1.000 | 1.5247 | 56 | 1.5214 |
| 4 | −8.330 | 20 | | | |
| 5 | 0.709 | 1.580 | 1.5247 | 56 | 1.5214 |
| 6 | −0.897 | 0.301 | | | |
| 7 | ∞ | 0.0875 | 1.6223 | 29 | 1.6190 |
| 8 | ∞ | | | | |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 17 shows the conical coefficients κ and aspherical coefficients $A_4, A_6 \ldots$ of each aspherical surface.

TABLE 17

| | 3 | 4 | 5 | 6 |
|---|---|---|---|---|
| κ | 0.00000 | 0.00000 | -1.40000 | -25.00000 |
| A4 | -1.68000E-05 | 1.46600E-04 | 2.76540E-01 | 8.85970E-01 |
| A6 | | 1.60000E-06 | -2.84950E-02 | -4.44020E+00 |
| A8 | | 4.00000E-08 | 4.29040E-02 | 2.06900E+01 |
| A10 | | | 4.50950E-02 | -8.22800E+01 |
| A12 | | | -2.21680E-01 | 2.19520E+02 |
| A14 | | | 5.19820E-01 | -3.58370E+02 |
| A16 | | | -4.85420E-01 | 3.24520E+02 |
| A18 | | | -6.81900E-02 | -1.26050E+02 |
| | | | 4.75720E-01 | 1.30000E+00 |
| | | | -2.66990E-01 | |

On the first surface 10a (surface #5) of the objective lens 10, the annular zone structure is provided. The following Table 18 shows the coefficients of the optical path difference function φ(h) defining the annular zone structure.

TABLE 18

| Surface | 5 |
|---|---|
| P2 | 8.20000E+01 |
| P4 | -3.00000E+01 |
| P6 | -3.70000E+01 |
| P8 | -9.00000E+00 |

FIG. 7A is a graph illustrating the spherical aberration caused when the information recording or information reproducing is executed for the optical disc D in the optical information recording/reproducing apparatus 100 according to the sixth example under a design reference temperature condition (i.e., room temperature). FIG. 7B is a graph illustrating the spherical aberration caused when the information recording or information reproducing is executed for the optical disc D in the optical information recording/reproducing apparatus 100 according to the sixth example under a condition where the temperature is 30° C. higher than the design reference temperature (room temperature).

Seventh Example

Hereafter, a seventh example of the optical information recording/reproducing apparatus 100 is described. The specifications of the optical system of an optical pick-up including the coupling lens 3 and the objective lens 10 according to the seventh example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 12.00
f: 1.41
NA: 0.85
λ: 405
β: -0.118
m: 1

Table 19 shows a specific numerical configuration of the optical information recording/reproducing apparatus 100 according to the seventh example defined when the optical disc D is used.

TABLE 19

| Surface No. | r | $d_0$ | $n_0$ | vd | $n_{T+30°\,C.}$ |
|---|---|---|---|---|---|
| 0 | | -0.500 | | | |
| 1 | ∞ | 2.750 | 1.5397 | 64 | 1.5397 |
| 2 | ∞ | 9.113 | | | |
| 3 | 72.500 | 1.000 | 1.5602 | 56 | 1.5569 |
| 4 | -7.370 | 20 | | | |
| 5 | 0.899 | 1.750 | 1.5602 | 56 | 1.5569 |
| 6 | -1.630 | 0.415 | | | |
| 7 | ∞ | 0.0875 | 1.6223 | 29 | 1.6190 |
| 8 | ∞ | | | | |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 20 shows the conical coefficients κ and aspherical coefficients $A_4, A_6 \ldots$ of each aspherical surface.

TABLE 20

| Surface | 3 | 4 | 5 | 6 |
|---|---|---|---|---|
| κ | 0.00000 | 0.00000 | -0.64000 | 0.00000 |
| A4 | -2.47000E-05 | 2.00000E-04 | 2.07140E-02 | 1.50510E+00 |
| A6 | | 2.65000E-06 | -5.15370E-03 | -5.47110E+00 |
| A8 | | 4.00000E-08 | 7.22060E-02 | 1.46430E+01 |
| A10 | | | -2.23980E-01 | -2.36470E+01 |
| A12 | | | 3.95900E-01 | 1.72430E+01 |
| A14 | | | -3.98580E-01 | 4.45900E+00 |
| A16 | | | 2.12040E-01 | -1.54090E+01 |
| A18 | | | -4.58020E-02 | 7.08200E+00 |

On the first surface 10a (surface #5) of the objective lens 10, the annular zone structure is provided. The following Table 21 shows the coefficients of the optical path difference function φ(h) defining the annular zone structure.

TABLE 21

| Surface | 5 |
|---|---|
| P2 | 3.50000E+01 |
| P4 | -4.00000E+00 |
| P6 | -1.00000E+01 |
| P8 | -6.00000E+00 |

FIG. 8A is a graph illustrating the spherical aberration caused when the information recording or information reproducing is executed for the optical disc D in the optical information recording/reproducing apparatus 100 according to the seventh example under a design reference temperature condition (i.e., room temperature). FIG. 8B is a graph illustrating the spherical aberration caused when the information recording or information reproducing is executed for the optical disc D in the optical information recording/reproducing apparatus 100 according to the seventh example under a condition where the temperature is 30° C. higher than the design reference temperature (room temperature).

Eighth Example

Hereafter, an eighth example of the optical information recording/reproducing apparatus 100 is described. The specifications of the optical system of an optical pick-up including the coupling lens 3 and the objective lens 10 according to the eighth example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 15.00 f: 1.41

NA: 0.85

λ: 405

β: −0.118 m: 1

Table 22 shows a specific numerical configuration of the optical information recording/reproducing apparatus 100 according to the eighth example defined when the optical disc D is used.

TABLE 22

| Surface No. | r | $d_0$ | $n_0$ | vd | $n_{T+30°\ C.}$ |
|---|---|---|---|---|---|
| 0 |  | −0.500 |  |  |  |
| 1 | ∞ | 2.750 | 1.5397 | 64 | 1.5397 |
| 2 | ∞ | 12.093 |  |  |  |
| 3 | −1403.000 | 1.000 | 1.6510 | 27 | 1.6477 |
| 4 | −9.700 | 20 |  |  |  |
| 5 | 0.899 | 1.750 | 1.5602 | 56 | 1.5569 |
| 6 | −1.630 | 0.415 |  |  |  |
| 7 | ∞ | 0.0875 | 1.6223 | 29 | 1.6190 |
| 8 | ∞ |  |  |  |  |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 23 shows the conical coefficients κ and aspherical coefficients $A_4, A_6 \ldots$ of each aspherical surface.

TABLE 23

| Surface | 3 | 4 | 5 | 6 |
|---|---|---|---|---|
| κ | 0.00000 | 0.00000 | −0.64000 | 0.00000 |
| A4 | −8.06000E−05 | −1.40000E−07 | 2.07140E−02 | 1.50510E+00 |
| A6 |  | 2.65000E−06 | −5.15370E−03 | −5.47110E+00 |
| A8 |  | 4.00000E−08 | 7.22060E−02 | 1.46430E+01 |
| A10 |  |  | −2.23980E−01 | −2.36470E+01 |
| A12 |  |  | 3.95900E−01 | 1.72430E+01 |
| A14 |  |  | −3.98580E−01 | 4.45900E+00 |
| A16 |  |  | 2.12040E−01 | −1.54090E+01 |
| A18 |  |  | −4.58020E−02 | 7.08200E+00 |

On the first surface 10a (surface #5) of the objective lens 10, the annular zone structure is provided. The following Table 24 shows the coefficients of the optical path difference function φ(h) defining the annular zone structure.

TABLE 24

| Surface | 5 |
|---|---|
| P2 | 3.50000E+01 |
| P4 | −4.00000E+00 |
| P6 | −1.00000E+01 |
| P8 | −6.00000E+00 |

FIG. 9A is a graph illustrating the spherical aberration caused when the information recording or information reproducing is executed for the optical disc D in the optical information recording/reproducing apparatus 100 according to the eighth example under a design reference temperature condition (i.e., room temperature). FIG. 9B is a graph illustrating the spherical aberration caused when the information recording or information reproducing is executed for the optical disc D in the optical information recording/reproducing apparatus 100 according to the eighth example under a condition where the temperature is 30° C. higher than the design reference temperature (room temperature).

Ninth Example

Hereafter, a ninth example of the optical information recording/reproducing apparatus 100 is described. The specifications of the optical system of an optical pick-up including the coupling lens 3 and the objective lens 10 according to the ninth example are indicated below. Specifically, f' representing the focal length of the coupling lens 3, f representing the focal length of the objective lens 10, NA, the wavelength of the laser beam emitted by the light source 1, the magnification β of the optical system of an optical pick-up and the diffraction order m are as follows.

f': 14.10
f: 1.41
NA: 0.85
λ: 405
β: −0.100
m: 1

Table 25 shows a specific numerical configuration of the optical information recording/reproducing apparatus 100 according to the ninth example defined when the optical disc D is used.

TABLE 25

| Surface No. | r | $d_0$ | $n_0$ | vd | $n_{T+30°\ C.}$ |
|---|---|---|---|---|---|
| 0 |  | −0.500 |  |  |  |
| 1 | ∞ | 2.750 | 1.5397 | 64 | 1.5397 |
| 2 | ∞ | 11.22 |  |  |  |
| 3 | 63.400 | 1.000 | 1.5247 | 56 | 1.5214 |
| 4 | −8.330 | 20 |  |  |  |
| 5 | 0.858 | 1.780 | 1.5247 | 56 | 1.5214 |
| 6 | −1.285 | 0.409 |  |  |  |
| 7 | ∞ | 0.0875 | 1.6223 | 30 | 1.6190 |
| 8 | ∞ |  |  |  |  |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 26 shows the conical coefficients κ and aspherical coefficients $A_4, A_6 \ldots$ of each aspherical surface.

TABLE 26

| Surface | 3 | 4 | 5 | 6 |
|---|---|---|---|---|
| κ | 0.00000 | 0.00000 | −0.67000 | 0.00000 |
| A4 | −1.68000E−05 | 1.46600E−04 | 2.03700E−02 | 1.99590E+00 |
| A6 |  | 1.60000E−06 | −6.94780E−03 | −8.57060E+00 |
| A8 |  | 4.00000E−08 | 8.22160E−02 | 2.89590E+01 |
| A10 |  |  | −2.64170E−01 | −6.56550E+01 |
| A12 |  |  | 4.72940E−01 | 9.52290E+01 |
| A14 |  |  | −4.86180E−01 | −8.42170E+01 |
| A16 |  |  | 2.62620E−01 | 4.05110E+01 |
| A18 |  |  | −5.47650E−02 | −7.17410E+00 |
| A20 |  |  | −1.63460E−03 | −6.82150E−01 |

On the first surface 10a (surface #5) of the objective lens 10, the annular zone structure is provided. The following Table 27 shows the coefficients of the optical path difference function φ(h) defining the annular zone structure.

TABLE 27

| Surface | 5 |
|---|---|
| P2 | 4.50000E+01 |
| P4 | −1.00000E+01 |
| P6 | −1.25000E+01 |
| P8 | −7.50000E+00 |

FIG. 10A is a graph illustrating the spherical aberration caused when the information recording or information reproducing is executed for the optical disc D in the optical information recording/reproducing apparatus 100 according to the ninth example under a design reference temperature condition (i.e., room temperature). FIG. 10B is a graph illustrating the spherical aberration caused when the information recording or information reproducing is executed for the optical disc D in the optical information recording/reproducing apparatus 100 according to the ninth example under a condition where the temperature is 30° C. higher than the design reference temperature (room temperature).

Tenth Example

Hereafter, a tenth example of the optical information recording/reproducing apparatus 100 is described. The specifications of the optical system of an optical pick-up including the coupling lens 3 and the objective lens 10 according to the tenth example are indicated below. Specifically, f' representing the focal length of the coupling lens 3, f representing the focal length of the objective lens 10, NA, the wavelength λ of the laser beam emitted by the light source 1, the magnification β of the optical system of an optical pick-up and the diffraction order m are as follows.

f': 14.10
f: 1.41
NA: 0.85
λ: 405
β: −0.100
m: 2

Table 28 shows a specific numerical configuration of the optical information recording/reproducing apparatus 100 according to the tenth example defined when the optical disc D is used.

TABLE 28

| Surface No. | r | $d_0$ | $n_0$ | vd | $n_{T+30°\ C.}$ |
|---|---|---|---|---|---|
| 0 |  | −0.500 |  |  |  |
| 1 | ∞ | 2.750 | 1.5397 | 64 | 1.5397 |
| 2 | ∞ | 11.714 |  |  |  |
| 3 | 91.700 | 1.000 | 1.5602 | 56 | 1.5214 |
| 4 | −8.610 | 20 |  |  |  |
| 5 | 0.897 | 1.750 | 1.5602 | 56 | 1.5214 |
| 6 | −1.635 | 0.414 |  |  |  |
| 7 | ∞ | 0.0875 | 1.6223 | 30 | 1.6190 |
| 8 | ∞ |  |  |  |  |

Each of the first surface 3a (surface #3) and the second surface 3b (surface #4) of the coupling lens 3, and the first surface 10a (surface #5) and the second surface 10b (surface #6) of the objective lens 10 is an aspherical surface, and is optimally designed for information recording and information reproducing for the optical disc D. The following Table 29 shows the conical coefficients κ and aspherical coefficients $A_4, A_6 \ldots$ of each aspherical surface.

TABLE 29

| Surface | 3 | 4 | 5 | 6 |
|---|---|---|---|---|
| κ | 0.00000 | 0.00000 | −0.64000 | 0.00000 |
| A4 | −1.68000E−05 | 1.23000E−04 | 2.06420E−02 | 1.52750E+00 |
| A6 | | 1.24000E−06 | 4.45910E−06 | −5.91900E+00 |
| A8 | | | 3.99920E−02 | 1.84110E+01 |
| A10 | | | −1.25500E−01 | −4.01390E+01 |
| A12 | | | 2.25850E−01 | 5.75740E+01 |
| A14 | | | −2.32010E−01 | −5.15080E+01 |
| A16 | | | 1.27020E−01 | 2.59890E+01 |
| A18 | | | −2.84220E−02 | −5.63230E+00 |

On the first surface 10a (surface #5) of the objective lens 10, the annular zone structure is provided. The following Table 30 shows the coefficients of the optical path difference function $\phi(h)$ defining the annular zone structure.

TABLE 30

| Surface | 5 |
|---|---|
| P2 | 1.80000E+01 |
| P4 | −2.00000E+00 |
| P6 | −5.00000E+00 |
| P8 | −3.00000E+00 |

FIG. 11A is a graph illustrating the spherical aberration caused when the information recording or information reproducing is executed for the optical disc D in the optical information recording/reproducing apparatus 100 according to the tenth example under a design reference temperature condition (i.e., room temperature). FIG. 10B is a graph illustrating the spherical aberration caused when the information recording or information reproducing is executed for the optical disc D in the optical information recording/reproducing apparatus 100 according to the tenth example under a condition where the temperature is 30° C. higher than the design reference temperature (room temperature).

The following Table 31 shows, for each of the first to tenth examples (and a comparative example which is explained later), the sums ($\Sigma\phi_{0.00-1.00}$) and ($\Sigma\phi_{0.95-1.00}$) regarding absolute values of heights of all the steps, the number of steps M in the effective beam diameter, the third order spherical aberrations (SAs) at the design reference temperature and at the temperature 30° higher than the design reference temperature, and the working distance WD in the optical information recording/reproducing apparatus 100.

TABLE 31

| | unit | 1st Example | 2nd Example | 3rd Example | 4th Example | 5th Example | 6th Example |
|---|---|---|---|---|---|---|---|
| $\Sigma\phi_{0.95-1.00}$ | μm | 13.0 | 13.0 | 5.8 | 5.8 | 5.8 | 8.5 |
| $\Sigma\phi_{0.00-1.00}$ | μm | 44.1 | 44.1 | 25.3 | 25.3 | 25.3 | 40.9 |
| Number of steps M within effective beam diameter | | 122 | 122 | 70 | 70 | 70 | 106 |
| 3rd order SA at design reference temperature | $\lambda_{rms}$ | 0.001 | 0.001 | 0.000 | 0.000 | 0.000 | 0.000 |
| 3rd order SA at 30° higher than the design reference temperature | $\lambda_{rms}$ | 0.004 | 0.016 | 0.014 | 0.012 | 0.016 | 0.001 |
| WD | mm | 0.389 | 0.389 | 0.301 | 0.301 | 0.301 | 0.301 |

| | unit | 7th Example | 8th Example | 9th Example | 10th Example | Comparative Example |
|---|---|---|---|---|---|---|
| $\Sigma\phi_{0.95-1.00}$ | μm | 10.1 | 10.1 | 14.7 | 10.1 | — |
| $\Sigma\phi_{0.00-1.00}$ | μm | 36.1 | 36.1 | 52.5 | 36.1 | — |
| Number of steps M within effective beam diameter | | 100 | 100 | 136 | 100 | — |
| 3rd order SA at design reference temperature | $\lambda_{rms}$ | 0.001 | 0.000 | 0.000 | 0.000 | 0.000 |
| 3rd order SA at 30° higher than the design reference temperature | $\lambda_{rms}$ | 0.018 | 0.020 | 0.001 | 0.018 | 0.091 |
| WD | mm | 0.415 | 0.415 | 0.409 | 0.414 | — |

The following Table 32 shows, for each of the first to tenth examples (and the comparative example described later), the values of the above described conditions (1) to (6).

(unit: μm) between a pupil height corresponding to 95% of the effective beam radius and a pupil height corresponding to 100% of the effective beam radius), the annular zone width

TABLE 32

| | unit | 1st Example | 2nd Example | 3rd Example | 4th Example | 5th Example | 6th Example |
|---|---|---|---|---|---|---|---|
| Condition (1) $\beta$ | | −0.118 | −0.083 | −0.098 | −0.107 | −0.083 | −0.083 |
| Condition (2) f | mm | 1.41 | 1.41 | 1.18 | 1.18 | 1.18 | 1.18 |
| Condition (3) $(((\Sigma\phi_{0.95-1.00})/(\Sigma\phi_{0.95-1.00})) \times ((d_o \times n)/(f \times NA/0.85)^4))/(P_{ave} + 1/L)$ | | 0.098 | 0.098 | 0.079 | 0.079 | 0.079 | 0.095 |
| Condition (4) $(D/(f \times (1 - \beta) \times \Delta t))$ | | −22.2 | −45.8 | −37.9 | −31.5 | −52.6 | −55.7 |
| Condition (5) $(mM/(f \times h^4))$ | | 2.61 | 2.61 | 3.72 | 3.72 | 3.72 | 5.63 |
| Condition (6) d | mm | 15 | 15 | 15 | 10 | 10 | 20 |

| | unit | 7th Example | 8th Example | 9th Example | 10th Example | Comparative Example |
|---|---|---|---|---|---|---|
| Condition (1) $\beta$ | | −0.118 | −0.094 | −0.100 | −0.100 | −0.118 |
| Condition (2) f | mm | 1.41 | 1.41 | 1.41 | 1.41 | 1.141 |
| Condition (3) $(((\Sigma\phi_{0.95-1.00})/(\Sigma\phi_{0.95-1.00})) \times ((d_o \times n)/(f \times NA/0.85)^4))/(P_{ave} + 1/L)$ | | 0.074 | 0.074 | 0.093 | 0.078 | — |
| Condition (4) $(D/(f \times (1 - \beta) \times \Delta t))$ | | −22.8 | −35.7 | −28.4 | −30.9 | — |
| Condition (5) $(mM/(f \times h^4))$ | | 2.14 | 2.14 | 2.91 | 4.28 | — |
| Condition (6) d | mm | 20 | 20 | 15 | 15 | — |

The following Table 33 shows, for each of the first to tenth examples (and the comparative example described later), the number of steps formed, within the range of 95% to 100% of the effective beam radius, on the first surface 10a of the objective lens 10, the width corresponding to the range of 95% to 100% of the effective beam radius (i.e., a distance $P_{ave}$ (unit: μm), the maximum angle θ (unit: degree) within the range of 95% to 100%, the absolute value of the height L of the step (unit: μm) at the maximum angle position, the absolute value of the height $L_0$ of the step (unit: μm) at the optical axis.

TABLE 33

| | unit | 1st Example | 2nd Example | 3rd Example | 4th Example | 5th Example | 6th Example |
|---|---|---|---|---|---|---|---|
| Number of steps within range of 95% to 100% | steps | 18 | 18 | 8 | 8 | 8 | 11 |
| Width corresponding to range of 95% to 100% | μm | 60 | 60 | 50 | 50 | 50 | 50 |
| Average annular zone width $P_{ave}$ (= width/Number of steps) | μm | 3.3 | 3.3 | 6.3 | 6.3 | 6.3 | 4.5 |
| Maximum angle θ within range of 95% to 100% | degree | 66.5 | 66.5 | 67.0 | 67.0 | 67.0 | 64.1 |
| Height of step L at maximum angle position | μm | 1.32 | 1.32 | 1.33 | 1.33 | 1.33 | 1.34 |
| Height of step $L_0$ at optical axis | μm | 0.72 | 0.72 | 0.72 | 0.72 | 0.72 | 0.77 |

| | unit | 7th Example | 8th Example | 9th Example | 10th Example | Comparative Example |
|---|---|---|---|---|---|---|
| Number of steps within range of 95% to 100% | steps | 14 | 14 | 19 | 14 | — |
| Width corresponding to range of 95% to 100% | μm | 60 | 60 | 60 | 60 | — |

TABLE 33-continued

| | | | | | | |
|---|---|---|---|---|---|---|
| Average annular zone width $P_{ave}$ (= width/Number of steps) | μm | 4.3 | 4.3 | 3.2 | 4.3 | — |
| Maximum angle θ within range of 95% to 100% | degree | 67.2 | 67.2 | 59.2 | 67.4 | |
| Height of step L at maximum angle position | μm | 1.34 | 1.34 | 1.26 | 2.06 | |
| Height of step $L_0$ at optical axis | μm | 0.72 | 0.72 | 0.77 | 1.45 | — |

As shown in Table 32, all of the first to tenth examples satisfy the conditions (1) to (6). In particular, by satisfying the conditions (1) to (3), it becomes possible to suppress variation of the spherical aberration due to the temperature changes and to maintain the suitable optical performance for information recording and information reproducing, while securing an adequate working distance WD. Furthermore, decrease of the light amount due to a transferring failure of the annular zone structure becomes hard to occur. Furthermore, since there is no necessity to move the coupling lens 3 for correction of the spherical aberration caused by the temperature changes, the moving range of the coupling lens 3 can be set to be small, which is advantageous in regard to downsizing of the optical information recording/reproducing apparatus 100. Furthermore, since the adequate annular zone width $P_{ave}$ is secured as shown in Table 33, it is possible to effectively prevent the annular zone structure itself from blocking the light beam.

Next, a comparative example is explained. The optical information recording/reproducing apparatus according to the comparative example has substantially the same configuration as that of the first example excepting that each of the first and second surfaces of the objective lens in the comparative example is not provided with the annular zone structure. FIG. 12A is a graph illustrating the spherical aberration caused when the information recording or information reproducing is executed for the optical disc D in the optical information recording/reproducing apparatus 100 according to the comparative example under a design reference temperature condition (i.e., room temperature). FIG. 12B is a graph illustrating the spherical aberration caused when the information recording or information reproducing is executed for the optical disc D in the optical information recording/reproducing apparatus 100 according to the comparative example under a condition where the temperature is 30° C. higher than the design reference temperature (room temperature). Since the comparative example does not satisfy the condition (3), the spherical aberration caused by the temperature changes is large in the comparative example. Therefore, in the comparative example, a great degree of deterioration of the recording performance or the reproducing performance for the optical disc D occurs when the temperature change occurs.

As can be seen from comparison between the first to tenth examples and the comparative example, the optical information recording/reproducing apparatus according to each of the first to tenth examples is able to maintain the adequate optical performance for information recording and information reproducing for the optical disc D. Therefore, it is possible to provide the optical system of an optical pick-up made of resin having advantageous in regard to securing the adequate light amount and the adequate working distance WD.

Although the present invention has been described in considerable detail with reference to certain preferred embodiments thereof, other embodiments are possible.

This application claims priority of Japanese Patent Applications No. P2009-248710, filed on Oct. 29, 2009, and No. P2010-161118, filed on Jul. 16, 2010. The entire subject matter of the applications is incorporated herein by reference.

What is claimed is:

1. An optical system of an optical pick-up, comprising:
a coupling lens that is made of resin and changes a degree of divergence of a light beam emitted by a light source; and
an objective lens that is made of resin and has a numerical aperture NA larger than 0.8, the objective lens converging the light beam emerging from the coupling lens onto a recording surface of an optical disc,
wherein:
when β represents a magnification of an optical system formed by the coupling lens and the objective lens with respect to a use wavelength λ (unit: nm), the magnification β satisfies a condition:

$$-0.13 < \beta < -0.08 \qquad (1);$$

when f (unit: mm) represents a focal length of the objective lens with respect to the use wavelength λ, the focal length f satisfies a condition:

$$1.5 < f < 1.50 \qquad (2);$$

the objective lens has an annular zone structure on at least one surface of the objective lens, the annular zone structure having a plurality of annular zones and having steps each of which extends in a direction of an optical axis of the objective lens and is formed at a boundary between adjacent ones of the plurality of annular zones to cause a predetermined optical path length difference between a light beam passing inside the boundary and a light beam passing outside the boundary; and
when ($\Sigma\phi_{0.00-1.00}$) represents a sum of absolute values of heights of all the steps of the annular zone structure formed within an effective beam diameter, ($\Sigma\phi_{0.95-1.00}$) represents a sum of absolute values of heights of all the steps of the annular zone structure formed within a range of 95% to 100% of an effective beam radius with respect to the optical axis, n represents a refractive index of the objective lens at the use wavelength λ, and $d_0$ (unit: mm) represents a thickness of the objective lens defined on the optical axis, $P_{ave}$ represents an average of distances between adjacent ones of the steps formed within the range of 95% to 100% of the effective beam radius, θ represents a maximum angle of angles formed, within the range of 95% to 100% of the effective beam radius, between a normal to the at least one surface on which the annular zone structure is formed and a line parallel with the optical axis, L represents an absolute value of a height of a step formed at a position corresponding to the maximum angle, $L_0$ represents an absolute value of a height of a step formed at a position corresponding to the optical axis, and m represents a diffraction order at which a diffraction efficiency is maximized for the light beam having the use wavelength λ incident on the at least one surface on which the annular zone structure is formed, the optical system of an optical pick-up satisfies a condition:

$$0.065 < \frac{\left(\frac{(\sum \Phi_{0.95-1.00})}{(\sum \Phi_{0.00-1.00})} \times \frac{d_0 \times n}{f^2 \times \left(\frac{NA}{0.85}\right)^4}\right)}{P_{ave} + \frac{1}{L}} < 0.100 \quad (3)$$

where $$L = L_0 + (1 - \cos\theta)$$

$$L_0 = \frac{m\lambda}{n-1}.$$

2. The optical system of an optical pick-up according to claim 1,
wherein:
when D (unit: mm) represents a moving amount of the coupling lens necessary for correcting a spherical aberration caused by a difference in an optical distance between a surface of a protective layer and the recording surface of the optical disc used for recording or reproducing, and Δt (unit: mm) represents a change amount of the optical distance, the optical system of an optical pick-up satisfies a condition:

$$-60 < \frac{D}{f \times (1-\beta) \times \Delta t} < -20 \quad (4)$$

where the moving amount D is negative when the coupling lens moves in a direction deviating from the light source and is positive when the coupling lens moves in a direction approaching the light source, and the change amount Δt is negative when the optical distance changes to be short and is positive when the optical distance changes to be long.

3. The optical system of an optical pick-up according to claim 1, wherein the coupling lens is moved only for correction of a spherical aberration caused by a difference in the optical distance, a wavelength shift of the light beam from the light source, and a manufacturing error of the objective lens.

4. The optical system of an optical pick-up according to claim 1,
wherein when M represents a number of steps of the annular zone structure formed within the effective beam diameter, and h represents an effective beam radius of the resin objective lens, the optical system of an optical pick-up satisfies a following condition (5):

$$2.0 < \frac{mM}{f \times h^4} < 5.8. \quad (5)$$

5. The optical system of an optical pick-up according to claim 4, wherein the diffraction order m is a first order.

6. The optical system of an optical pick-up according to claim 1, wherein when d (unit: mm) represents a distance between the coupling lens and the objective lens, the optical system of an optical pick-up satisfies a condition $$8 < d < 25 \quad (6).$$

7. An optical information recording/reproducing apparatus for recording information to and/or reproducing information from an optical disc based on a predetermined standard, comprising:
a light source that emits a light beam having a wavelength λ;
an optical system of an optical pick-up; and
a signal processing unit configured to detect a returning light beam returning from a recording surface of the optical disc and to execute predetermined signal processing on the returning light beam,
the optical system of an optical pick-up comprising:
a coupling lens that is made of resin and changes a degree of divergence of a light beam emitted by a light source; and
an objective lens that is made of resin and has a numerical aperture NA larger than 0.8, the objective lens converging the light beam emerging from the coupling lens onto a recording surface of an optical disc,
wherein:
when β represents a magnification of an optical system formed by the coupling lens and the objective lens with respect to a use wavelength λ (unit: nm), the magnification P satisfies a condition:

$$-0.13 < \beta < -0.08 \quad (1);$$

when f (unit: mm) represents a focal length of the objective lens with respect to the use wavelength λ, the focal length f satisfies a condition:

$$15 < f < 1.50 \quad (2);$$

the objective lens has an annular zone structure on at least one surface of the objective lens, the annular zone structure having a plurality of annular zones and having steps each of which extends in a direction of an optical axis of the objective lens and is formed at a boundary between adjacent ones of the plurality of annular zones to cause a predetermined optical path length difference between a light beam passing inside the boundary and a light beam passing outside the boundary; and
when ($\Sigma\phi_{0.00-1.00}$) represents a sum of absolute values of heights of all the steps of the annular zone structure formed within an effective beam diameter, ($\Sigma\phi_{0.95-1.00}$) represents a sum of absolute values of heights of all the steps of the annular zone structure formed within a range of 95% to 100% of an effective beam radius with respect to the optical axis, n represents a refractive index of the objective lens at the use wavelength λ, and $d_0$ (unit: mm) represents a thickness of the objective lens defined on the optical axis, $P_{ave}$ represents an average of distances between adjacent ones of the steps formed within the range of 95% to 100% of the effective beam radius, θ represents a maximum angle of angles formed, within the range of 95% to 100% of the effective beam radius, between a normal to the at least one surface on which the annular zone structure is formed and a line parallel with the optical axis, L represents an absolute value of a height of a step formed at a position corresponding to the maximum angle, $L_0$ represents an absolute value of a height of a step formed at a position corresponding to the optical axis, and m represents a diffraction order at which a diffraction efficiency is maximized for the light beam having the use wavelength λ incident on the at least one surface on which the annular zone structure is formed, the optical system of an optical pick-up satisfies a condition:

$$0.065 < \frac{\left(\frac{\sum \Phi_{0.95-1.00}}{\sum \Phi_{0.00-1.00}}\right) \times \frac{d_0 \times n}{f^2 \times \left(\frac{NA}{0.85}\right)^4}}{P_{ave} + \frac{1}{L}} < 0.100 \qquad (3)$$

where $L = L_0 + (1 - \cos\theta)$ $L_0 = \frac{m\lambda}{n-1}$.

8. The optical information recording/reproducing apparatus according to claim 7,
wherein:
when D (unit: mm) represents a moving amount of the coupling lens necessary for correcting a spherical aberration caused by a difference in an optical distance between a surface of a protective layer and the recording surface of the optical disc used for recording or reproducing, and Δt (unit: mm) represents a change amount of the optical distance, the optical system of an optical pick-up satisfies a condition:

$$-60 < \frac{D}{f \times (1-\beta) \times \Delta t} < -20 \qquad (4)$$

where the moving amount D is negative when the coupling lens moves in a direction deviating from the light source and is positive when the coupling lens moves in a direction approaching the light source, and the change amount Δt is negative when the optical distance changes to be short and is positive when the optical distance changes to be long.

9. The optical information recording/reproducing apparatus according to claim 7, wherein the coupling lens is moved only for correction of a spherical aberration caused by a difference in the optical distance, a wavelength shift of the light beam from the light source, and a manufacturing error of the objective lens.

10. The optical information recording/reproducing apparatus according to claim 7, wherein when M represents a number of steps of the annular zone structure formed within the effective beam diameter, and h represents an effective beam radius of the resin objective lens, the optical system of an optical pick-up satisfies a following condition (5):

$$2.0 < \frac{mM}{f \times h^4} < 5.8. \qquad (5)$$

11. The optical information recording/reproducing apparatus according to claim 10, wherein the diffraction order m is a first order.

12. The optical information recording/reproducing apparatus according to claim 7, wherein when d (unit: mm) represents a distance between the coupling lens and the objective lens, the optical system of an optical pick-up satisfies a condition $8 < d < 25 \qquad (6).$

* * * * *